US009373320B1

(12) United States Patent
Lyon et al.

(10) Patent No.: US 9,373,320 B1
(45) Date of Patent: Jun. 21, 2016

(54) SYSTEMS AND METHODS FACILITATING SELECTIVE REMOVAL OF CONTENT FROM A MIXED AUDIO RECORDING

(71) Applicant: Google Inc., Mountain View, CA (US)

(72) Inventors: Richard Francis Lyon, Los Altos, CA (US); Ron Weiss, New York, NY (US); Thomas Chadwick Walters, Bromely (GB)

(73) Assignee: Google Inc., Mountain View, CA (US)

(*) Notice: Subject to any disclaimer, the term of this patent is extended or adjusted under 35 U.S.C. 154(b) by 490 days.

(21) Appl. No.: 13/972,262

(22) Filed: Aug. 21, 2013

(51) Int. Cl.
| | | |
|---|---|---|
| *G10L 21/028* | (2013.01) | |
| *G10L 13/033* | (2013.01) | |
| *G10L 21/02* | (2013.01) | |
| *G10L 21/0272* | (2013.01) | |
| *G10L 21/0308* | (2013.01) | |

(52) U.S. Cl.
CPC ............ *G10L 13/033* (2013.01); *G10L 21/02* (2013.01); *G10L 21/028* (2013.01); *G10L 21/0272* (2013.01); *G10L 21/0308* (2013.01)

(58) Field of Classification Search
CPC ............ G10L 21/0272; G10L 21/028; G10L 21/0308
See application file for complete search history.

(56) References Cited

U.S. PATENT DOCUMENTS

| 5,140,637 | A | * | 8/1992 | McCarthy | ................. H04S 1/00 381/1 |
| 6,690,799 | B1 | * | 2/2004 | Iwase | ....................... H04S 1/00 381/1 |
| 7,672,466 | B2 | | 3/2010 | Yamada et al. | |
| 8,370,164 | B2 | | 2/2013 | Beack et al. | |
| 2002/0083060 | A1 | * | 6/2002 | Wang | ................. G06F 17/30743 |
| 2006/0008092 | A1 | * | 1/2006 | Baril | ..................... G09B 15/00 381/77 |
| 2006/0204019 | A1 | * | 9/2006 | Suzuki | ................ G10L 21/0272 381/92 |
| 2007/0021959 | A1 | | 1/2007 | Goto | |
| 2007/0076902 | A1 | * | 4/2007 | Master | ..................... H04S 7/00 381/94.3 |
| 2008/0075292 | A1 | * | 3/2008 | Wong | ....................... G10H 1/20 381/61 |

(Continued)

FOREIGN PATENT DOCUMENTS

WO    2010003346    1/2010

OTHER PUBLICATIONS

Hrebień, Maciej, and Józef Korbicz. "Hough transform in music tunes recognition systems." Artificial Intelligence and Soft Computing—ICAISC 2008. Springer Berlin Heidelberg, 2008. 588-596.*

(Continued)

*Primary Examiner* — Brian Albertalli
(74) *Attorney, Agent, or Firm* — Byrne Poh LLP

(57) ABSTRACT

Systems and methods facilitating removal of content from audio files are described. A method includes identifying a sound recording in a first audio file, identifying a reference file having at least a defined level of similarity to the sound recording, and processing the first audio file to remove the sound recording and generate a second audio file. In some embodiments, winner-take-all coding and Hough transforms are employed for determining alignment and rate adjustment of the reference file in the first audio file. After alignment, the reference file is filtered in the frequency domain to increase similarity between the reference file and the sound recording. The frequency domain representation (FR) of the filtered version is subtracted from the FR first audio and the result converted to a time representation of the second audio file. In some embodiments, spectral subtraction is also performed to generate a further improved second audio file.

30 Claims, 14 Drawing Sheets

(56) References Cited

U.S. PATENT DOCUMENTS

| | | | |
|---|---|---|---|
| 2009/0185636 A1* | 7/2009 | Palotai | G06K 9/0051 375/285 |
| 2012/0185068 A1 | 7/2012 | Eppolito | |
| 2012/0203719 A1* | 8/2012 | Mitsufuji | G10L 21/0308 706/12 |
| 2012/0300941 A1* | 11/2012 | Shim | H04R 5/04 381/1 |
| 2013/0226558 A1* | 8/2013 | Mysore | G10L 21/028 704/9 |

OTHER PUBLICATIONS

Jin, Xue-Cheng, and Zeng-Fu Wang. "Speech Separation from Background of Music Based on Single-channel Recording." Pattern Recognition, 2006. ICPR 2006. 18th International Conference on. vol. 4. IEEE, 2006.*

Aucouturier, Jean-Julien, and Mark Sandler. "Finding repeating patterns in acoustic musical signals: Applications for audio thumbnailing." Audio Engineering Society Conference: 22nd International Conference: Virtual, Synthetic, and Entertainment Audio. Audio Engineering Society, 2002.*

Dennis, Jonathan, Huy Dat Tran, and Eng Siong Chng. "Overlapping sound event recognition using local spectrogram features and the generalised hough transform." Pattern Recognition Letters 34.9 (2013): 1085-1093.*

Golge, "Google's Winner Takes All hashing implemmentation", uploaded to https://gist.github.com/erogol/6391423/revisions on Aug. 30, 2013.*

Raffel, et al., "Remixavier," HAMR 2013 Proceedings, Jul. 2, 2013, 3 pages, http://labrosa.ee.columbia.edu/hamr2013/proceedings/doku.php/remixavier, Last accessed Feb. 26, 2014.

"HAMR: Hacking Audio and Music Research," Jun. 28, 30, 2013, Columbia University, New York, NY, 2 pages, http://labrosa.ee.columbia.edu/hamr2013/, Last accessed Feb. 26, 2014.

* cited by examiner

SYSTEMS AND METHODS FACILITATING SELECTIVE REMOVAL OF CONTENT FROM A MIXED AUDIO RECORDING

TECHNICAL FIELD

This disclosure relates to audio processing that facilitates selective removal of content from mixed audio.

BACKGROUND

Audio recordings often include numerous different types of sound recordings. For example, audio recordings often include speech and music. Acoustic capture of sound can be facilitated through use of microphone and audio mixing can be employed to integrate multiple different sound recordings into a single audio recording. However, with conventional devices, systems or methods, it is difficult to selectively remove one or more sound recordings from a mixed audio recording.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods in this disclosure relate to selective removal of sound recordings from mixed audio. In one embodiment, a system includes: a memory storing computer-executable components; and a processor configured to execute computer-executable components stored in the memory. The computer-executable components can include a communication component and a processing component. The communication component can facilitate display of information indicative of an option to select one or more sound recordings for removal from a first audio file to generate a second audio file, and facilitate display of indicia of the second audio file. The processing component can generate the second audio file by removing the selected one or more sound recordings from the first audio file (e.g., based on winner-takes-all (WTA) coding). Hough transforms and filtering in frequency domain can also be employed to generate the second audio file.

In another embodiment, another system is provided. The system can include: a memory storing computer-executable components; and a processor configured to execute computer-executable components stored in the memory. The computer-executable components can include an identification component and a processing component. The identification component can: identify one or more sound recordings in a first audio file; and identify a reference file having at least a defined level of similarity to at least one of the one or more sound recordings. The processing component can remove, from the first audio file, at least one of the identified one or more sound recordings to generate a second audio file. The processing component can include an alignment and rate component that determines a first alignment between the reference file and the first audio file by comparing a WTA-coded spectrogram of the reference file and a WTA-coded spectrogram of the first audio file.

In another embodiment, a method can include employing a processor to execute computer-executable components stored within a memory to perform operations. The operations can include: identifying one or more sound recordings in a first audio file; and identifying a reference file having at least a defined level of similarity to at least one of the one or more sound recordings. The operations can also include processing the first audio file to remove the at least one of the one or more sound recordings from the first audio file and generate a second audio file. In some embodiments, processing includes determining a first alignment between the reference file and the first audio file based, at least, on comparing a WTA-coded spectrogram of the reference file and a WTA-coded spectrogram of the first audio file.

In another embodiment, an apparatus can include means for identifying one or more sound recordings in a first audio file, and means for identifying a reference file having at least a defined level of similarity to at least one of the one or more sound recordings. The apparatus can also include means for processing the first audio file to remove the at least one of the one or more sound recordings from the first audio file and generate a second audio file. In some embodiments, means for processing includes means for determining a first alignment between the reference file and the first audio file based, at least, on comparing a WTA-coded spectrogram of the reference file and a WTA-coded spectrogram of the first audio file.

Toward the accomplishment of the foregoing and related ends, the one or more embodiments include the features hereinafter fully described and particularly pointed out in the claims. The following description and the annexed drawings set forth in this disclosure detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
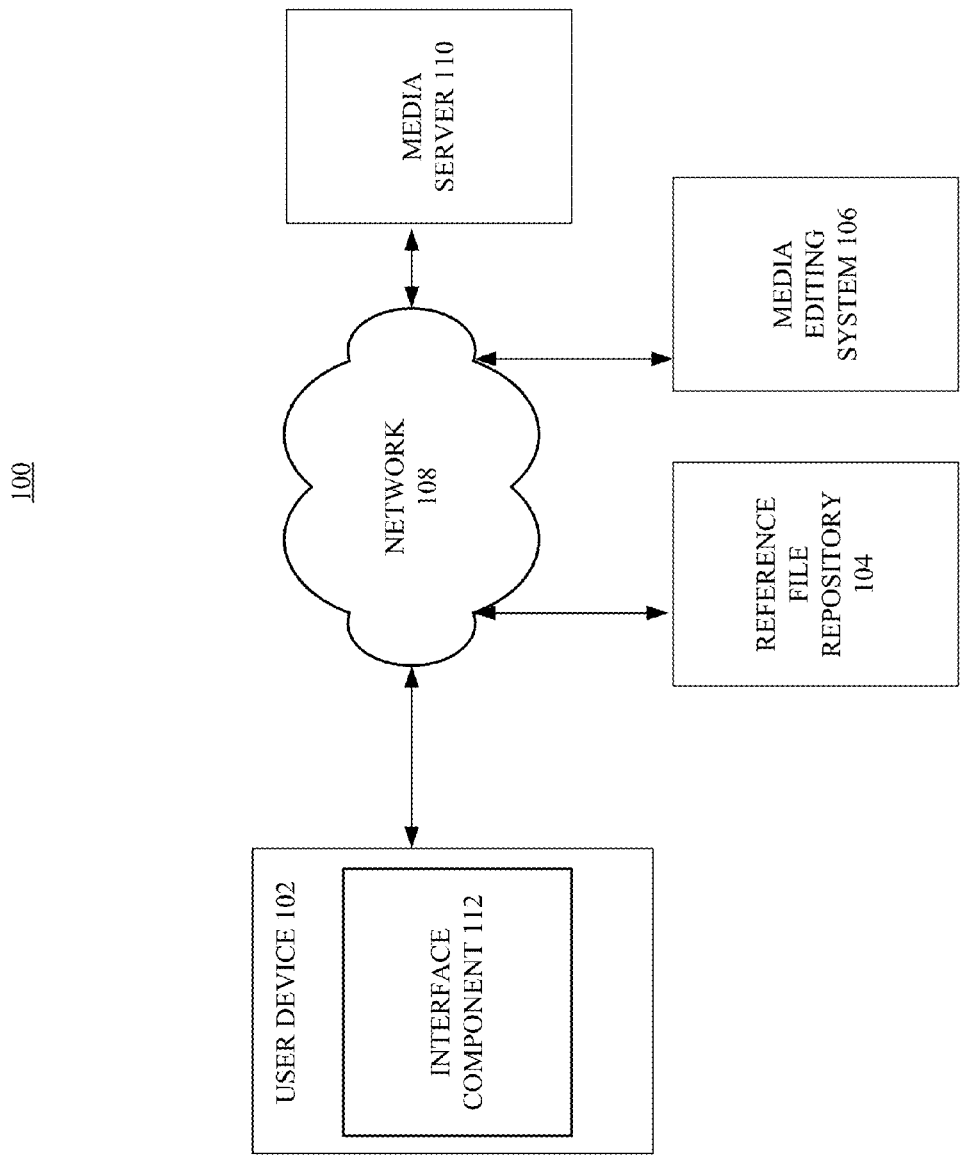
FIG. 1 is an illustration of a block diagram of a non-limiting system that facilitates selective removal of audio content from a mixed audio recording in accordance with one or more embodiments described herein.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In various instances, structures and devices are shown in block diagram form in order to facilitate describing one or more embodiments.

Many service providers allow users to upload media content to a server and/or transfer content to one or more different users. For example, users can upload and/or transfer audio and/or video content. However, typically, such service providers have very limited control over composition of the media content.

Current copyright protection schemes can compare uploaded media content to an index of validated and protected content to determine whether copyright rights are implicated. To facilitate the comparison, the copyright holder can provide copyrighted media content as a reference file. Policies for addressing content that match the copyrighted media content can be implemented and action taken to address issues related to the content. For example, if a match between the media content and the reference file is detected, a copyright claim can be generated regarding the uploaded media content. As such, depending on the policy implemented by the copyright holder, uploaded media content may need to be processed in one or more different manners.

In various different scenarios, content can be removed, attenuated and/or muted to address copyright issues. In one scenario, content in a media file is identified as including copyrighted audio and removed from the media file to mitigate non-acceptance of the media file by the service provider. The content can be removed from the media file to also mitigate unauthorized use allegations.

In another scenario, unwanted audio files in a media file can be removed, attenuated and/or muted to emphasize other audio in the media file. For example, automobile, train or airplane noise or a barking dog can make more important audio in a recording inaudible. These types of noise can be removed, attenuated or muted to allow the other audio to be clearly heard.

In another scenario, audio in a media file can be removed and replaced with other audio. For example, an audio track can be removed and replaced with another audio track. In another scenario, audio in a media file can be extracted for dubbing. For example, audio content can be extracted from a media file and replaced with re-recorded content in a language corresponding to the country in which the media file may be played.

In another scenario, extraneous and/or unwanted audio can be removed from content. In yet another scenario, an audio track within a media file can be selectively attenuated and enhanced to facilitate discernment of speech from a particular user. For example, multiple people may speak concurrently at a cocktail party, and processing can be employed to selectively attenuate one or more speakers or enhance one or more speakers. As another example, one portion of an audio track could be attenuated to allow other audio to be heard clearly while another portion of an audio track (e.g., a later-occurring portion) could be enhanced to allow the enhanced audio to be heard clearly.

Notwithstanding the widespread and numerous usage scenarios of the embodiments described herein, in cases in which the media content is embedded in other content (e.g., music embedded in video), efficient removal, attenuation, amplification and/or modification of the target media can be difficult.

Systems and methods described herein facilitate selective removal of one or more sound recordings from mixed audio. The sound recordings to be removed from the mixed audio can be identified and a reference file that is similar to the audio content to be removed can be determined. Coarse and fine alignment along with rate adjustment can be performed to align the audio file in which the sound recording is located and the reference file, and to adjust rate of the reference file, for efficient removal of the sound recordings. In some embodiments, coarse alignment and rate adjustment are performed based on a comparison of WTA-coded spectrograms of the reference and audio files, and mapping of information (e.g., candidate time offset and candidate rate ratio pairs) to Hough space. The reference and audio files are then aligned employing the optimal time offset, and the reference file is rate adjusted (e.g., rate stretched) to a rate matching that of the audio file. Fine alignment is performed within chunks of signal determine by the coarse alignment and computed based on performing a cross correlation between the reference and audio files.

After alignment and rate adjustment, a filter is generated in frequency domain based on determining a ratio between the frequency domain representation (FR) of the reference file and the FR of the audio file. The reference file is then filtered to result in a filtered version that has increased similarity to the sound recording to be removed. A residual, or second audio signal, is generated by aligning the reference and audio signal such that the reference signal is aligned with the portion of the audio signal having the sound recording to be removed, and subtracting the filtered version of the FR of the reference file from the FR of the audio signal. In some embodiments, a second, spectral subtraction can be performed on the residual, or second audio signal, to generate an enhanced signal. In either embodiment, an inverse transform is performed to obtain a time domain version of the waveform that represents the second audio file. The process is repeated for different segments of the reference file and audio file and the segments are overlapped to re-create the entire second audio file. The entire second audio file can be embedded in different types of media files in various embodiments.

One or more embodiments can advantageously provide accurate and efficient alignment of the reference file and first audio file with sample-level accuracy able to cope with drift between the reference file and the first audio file due, for example, to different sample rates. One or more embodiments also efficiently perform adaptive filtering in the frequency domain, rather than in the time domain, making use of certain mathematical constraints on the signal type to result in a system that is computationally efficient. Efficient systems and methods facilitating selective removal of sound recordings from mixed audio recordings can result.

Turning now to the drawings, FIG. 1 is an illustration of a block diagram of a non-limiting system that facilitates selective removal of audio content from a mixed audio recording in accordance with one or more embodiments described herein. System 100 can include a user device 102, reference file repository 104, media editing system 106, network 108 and/or media server 110. As used in this disclosure, the term "user" can refer to a person, entity, system, or combination thereof. The user device 102, reference file repository 104, media editing system 106 and/or media server 110 can be communicatively coupled to one another via network 108 and/or directly coupled to one another. While system 100 includes the components shown, in some embodiments, system 100 can include media editing system 106 and reference file repository 104. Additionally, system 100 can be communicatively and/or electrically coupled to a cloud-based video editor (not shown) in some embodiments.

Media editing system 106 can include hardware and/or software configured to communicate with user device 102, reference file repository 104 and/or media server 110. Communication can include, but is not limited to, receipt and/or transmission of media files from which sound recordings are to be removed, commands for display of information (e.g., information for selection of the sound recording) via a user interface of user device 102, transmission of media files having the sound recordings removed and the like. Such communication can facilitate selective removal of content (e.g., a selected sound recording) from media content (e.g., audio recording, video recording), which media editing system 106 can perform. For example, media editing system 106 can receive and/or access from a remote location a media file including audio content.

In various embodiments, the audio content can include one or more sound recordings interlaced with one another. For example, the audio content can include, but is not limited to, music (e.g., soundtracks), songs, speeches, and/or any other suitable audio content. For example, in one embodiment, the audio content can include a video performance of a cover song uploaded to user device 102 by a user, and media editing system 106 can identify the cover song by evaluating the reference files in reference file repository 104 that are similar to the cover song. Cover songs can include, but are not limited to, songs performed that feature different performers, instrumentation, performance conditions, and/or arrangements than the performers, instrumentation, conditions and/or arrangements of the song when originally recorded. For example, a cover song can be a live performance of a recorded song featuring the original performer of the recorded song. As another example, a cover song can be a performance of a song by a performer other than the original performer of the song.

In various embodiments, media editing system 106 can receive and/or access a media file from user device 102, reference file repository 104 or the like. However, in some embodiments, media editing system 106 can access a media file stored on and/or received from media server 110, which can be remote from or directly coupled to media editing system 106. In some embodiments, content can be stored in media editing system 106 prior to processing by media editing system 106.

For selective removal of one or more sound recordings from audio content, media editing system 106 can receive one or more commands for removal of the sound recordings and identify the one or more sound recordings of interest within the audio content. Media editing system 106 can then perform a number of different signal processing functions to align a reference file that has at least a defined level of similarity with the sound recording with the portion of the audio content at which the selected sound recording is located, match the rate of the reference file to the rate of the audio content, filter the reference file to cause the reference file to more closely approximate the sound recording selected for removal and/or generate a second audio file with the sound recording removed from the mixed audio file (or at least a portion of the sound recording removed from the mixed audio file). In some embodiments, media editing system 106 can generate a new media file having the selected sound recording removed.

Reference file repository 104 can store one or more reference files that can be accessed and/or employed by media editing system 106 to perform selective removal of one or more sound recordings from audio content. For example, the reference files stored in reference file repository 104 can be copyrighted media files (e.g., copyrighted songs or speech). Media editing system 106 can search reference files in reference file repository and identify a reference file that has a level of similarity to the sound recording that is at least greater than or approximately equal to a defined value. The value can vary over time and/or be based on type of media file of interest to obtain differing degrees of sound recording removal, e.g., as dictated by a system designer. In some embodiments, reference file repository 104 can be accessed by user device 102, media server 110 and/or media editing system 106 for storage or retrieval of one or more files that can serve as reference files for selective removal of audio content from a media file.

User device 102 can include hardware and/or software configured to enable receipt, transmission and/or processing of media files (e.g., audio and/or video files) to and/or from user device 102. For example, user device 102 can include hardware and/or software configured to receive uploaded media content at user device 102 and/or media content received from media server 110 or any number of other different types of devices configured to transmit media content. In various embodiments, user device 102 can include, but is not limited to, a cellular telephone, a tablet computer, a laptop computer, a personal digital assistant (PDA), a desktop computer, a television or the like.

In the embodiment shown, user device 102 includes interface component 112. Interface component 112 can be configured to output graphics and/or audio associated with a video and/or audio received at and/or processed by user device 102.

Interface component 112 can also receive inputs configured to cause user device 102 to perform one or more functions associated with transmitting, receiving, processing and/or displaying media files or content within media files. By way of example, but not limitation, interface component 112 can be configured to receive inputs to cause selection of one or more sound recordings integrated with the video and/or audio received at and/or processed by user device 102 as described in more detail with reference to FIG. 2.

Media server 110 can include hardware and/or software configured to store and/or transmit media files. Any number of different media files can be stored and/or transmitted including, but not limited to, videos, audio, images or a combination thereof. In some embodiments described herein, media server 110 can store and/or transmit a media file having one or more sound recordings that can be removed by media editing system 106.

Network 108 can be or include a wired or wireless channel providing connectivity between two or more points. For example, network 108 can communicatively and/or electrically couple one or more of media editing system 106, media server 110, user device 102 and/or reference file repository 104. By way of example, but not limitation, network 108 can be a cellular network, a wide area network (WAN) (e.g., Internet), a local area network (LAN), or a personal area network (PAN). Network 108 can utilize any number of different types of wired or wireless technology, including, for example, cellular, WAN, wireless fidelity (Wi-Fi), Wi-Max and/or WLAN.

Figure 2:
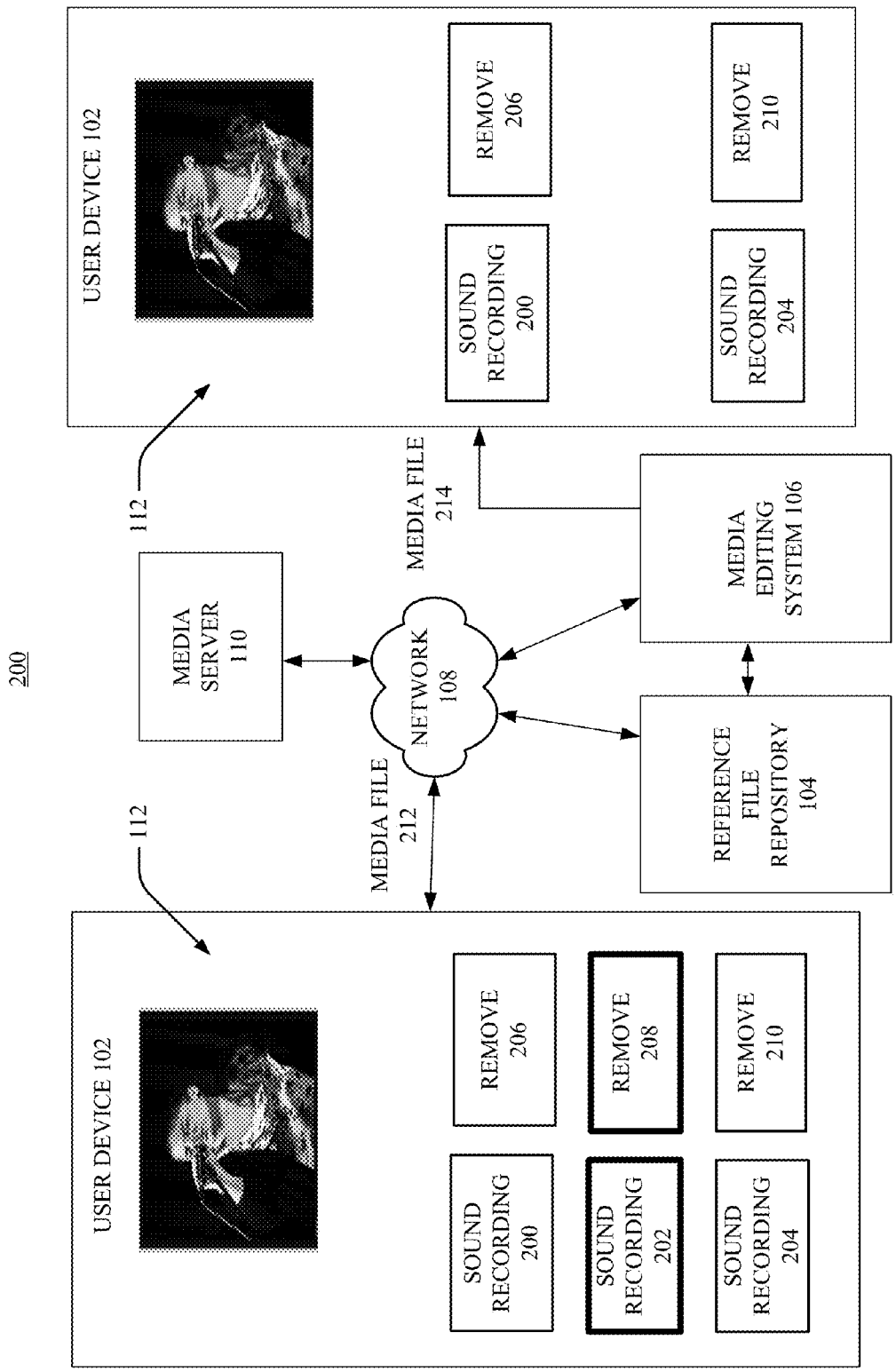
FIG. 2 is an illustration of a block diagram of a non-limiting system that facilitates selective removal of audio content from a mixed audio recording in accordance with one or more embodiments described herein.

FIG. 2 is an illustration of a block diagram of a non-limiting system that provides selective removal of audio content from a mixed audio recording in accordance with one or more embodiments described herein. In various embodiments, system 200 can include one or more of the structure and/or functionality of system 100 (and vice versa). Repetitive description of like elements employed in other embodiments is omitted for sake of brevity.

In system 200, as shown, user device 102 includes interface component 112 configured to display a video associated with media file 212 having an embedded audio file. The embedded audio file can include one or more sound recordings. For example, embedded audio file can include a recording of a copyrighted song playing as background music for the recording of a speech by user of user device 102.

As shown, interface component 112 can display information identifying or otherwise associated with one or more sound recordings 200, 202, 204 included in the first audio file of the media file. Interface component 112 can also display regions 206, 208, 210 that can be activated to select at least one of the one or more sound recordings 200, 202, 204 for removal from the audio file embedded in the media file. In the embodiment shown, sound recording 202 is selected for removal upon detection of activation of region 208 by user device 102.

Information indicative of the sound recording selected for removal and, in some embodiments, media file 212 can be received by or otherwise accessed by media editing system 106. Media editing system 106 can access a reference file stored in reference file repository 104 to facilitate removal of sound recording 202 from the audio of media file 212.

Media editing system 106 can output media file 214 having the selected sound recording removed. As shown, at user device 102, media file 214 includes sound recordings 200, 204 and does not include sound recording 202, which has been removed. As shown in FIG. 2, user device 102 can then play media file 214 having sound recording 202 removed. In one embodiment, for example, the audio file included in media file 212 can include speech and music, and the sound recording 202 selected for removal can be the music portion of the audio file. As such, the audio content of media file 214 can include only speech after processing with media editing system 106.

Figure 3:
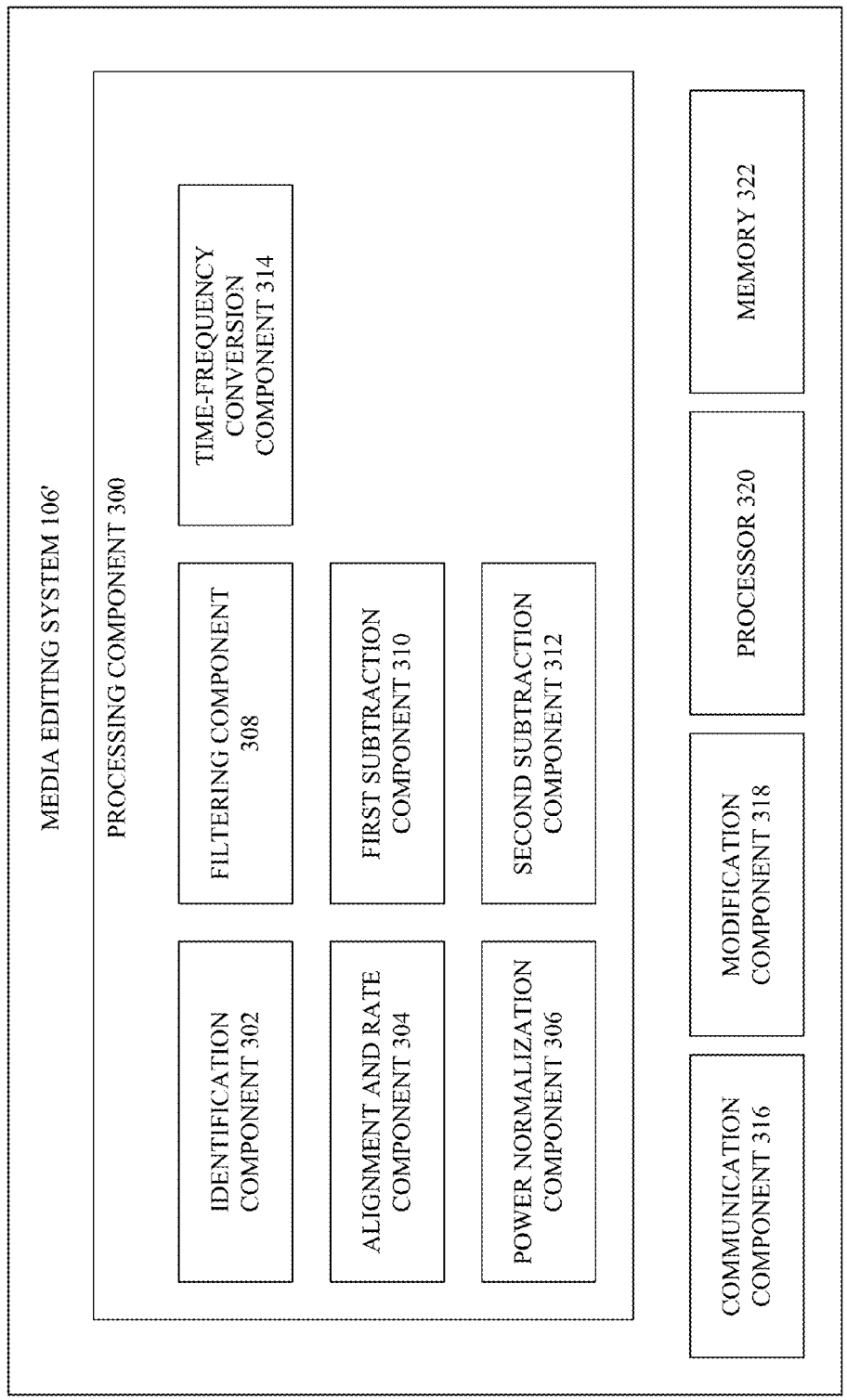
FIG. 3 is an illustration of a block diagram of a non-limiting media editing system that facilitates selective removal of audio content from a mixed audio recording in accordance with one or more embodiments described herein.

Media editing system 106 is described in greater detail, in various embodiments, with reference to FIG. 3. FIG. 3 is a block diagram of a non-limiting media editing system that facilitates selective removal of audio content from a mixed audio recording is shown. In various embodiments, media editing system 106' can include one or more of the structure and/or functionality of media editing system 106 (and vice versa).

As shown, media editing system 106' can include processing component 300, communication component 316, modification component 318, processor 320 and/or memory 322. In one or more embodiment, processing component 300, communication component 316, modification component 318, processor 320 and/or memory 322 can be communicatively and/or electrically coupled to one another to perform one or more of the functions of media editing system 106'.

Communication component 316 can transmit and/or receive information from and/or at media editing system 106'. In various embodiments, the information can be or include one or more different types of media files (e.g., video, audio), information indicative of a selection of or identification of one or more sound recordings of which the media file is composed (and which is to be removed from the media file and/or information indicative of a new media file generated by media editing system 106' after the selected sound recording has been removed (or substantially removed) by processing component 300 or the like.

In some embodiments, communication component 316 facilitates display of information regarding one or more policies associated with one or more sound recordings of which mixed audio in a media file is composed. For example, communication component 316 can receive a media file or information indicative of a media file. Based on the sound recording selected for removal, media editing system 106' can determine one or more policies associated with the sound recording. For example, policies related to the sound recording can indicate a preference to mute the sound recording or a preference to delete the sound recording from the mixed audio file. Information can be displayed on the user device indicative of the policy. Communication component 316 can receive information indicative of one or more inputs at the user device in response to the display of policy information.

In embodiments in which the sound recording is to be removed from the mixed audio file, processing component 300 can perform one or more signal processing methods to selectively remove the sound recording. As shown, processing component 300 can include identification component 302, alignment and rate component (ARC) 304, power normalization component 306, filtering component 308, first subtraction component 310, second subtraction component 312 and/or time-frequency conversion component 314. One or more of identification component 302, alignment and rate component (ARC) 304, power normalization component 306, filtering component 308, first subtraction component 310, second subtraction component 312 and/or time-frequency conversion component 314 can be communicatively and/or electrically coupled to one another to perform one or more functions of processing component 300.

Identification component 302 can identify a reference file that has at least a defined level of similarity with the sound recording selected for removal. For example, identification component 302 can determine one or more characteristics of the sound recording selected for removal from the audio file. Identification component 302 can then search a reference file repository that includes reference files (e.g., copyrighted content) for content having a predefined level of similarity with the characteristics from the sound recording. Identification component 302 can select the reference file and employ such file in removal of the sound recording by media editing system 106'.

In various embodiments, identification component 302 can identify the reference file to be used for removal based on determination of one or more characteristics of at least a segment of the sound recording, determination of content of at least a segment of the sound recording and/or utilization of one or more hashing schemes. By way of example, but not limitation, identification component 302 can compare an identifier (e.g., fingerprint), or portion of an identifier, for the sound recording to one or more identifiers for reference files, and determine one or more reference files that have a defined level of similarity to the sound recording based on the comparison of the identifiers. In some embodiments, a fingerprint can include a set of hash values, and identification component 302 can employ the set of hash values to lookup fingerprints in the set of reference files.

Turning now to ARC 304, a reference file identified by identification component 302 can be employed for alignment with the mixed audio file at or near a location corresponding to the location of the sound recording to be removed from the mixed audio file. For example, ARC 304 can determine the time offset in the mixed audio file at which the sound recording begins, and align the reference file to begin at such point so that the sound recording can be efficiently subtracted from the mixed audio file.

ARC 304 can also adjust the rate of the reference file to match (or substantially match) the rate of the mixed audio file (or, in some embodiments, the portion of the mixed audio file corresponding to the sound recording). ARC 304 can determine coarse alignment using a Hough transform on WTA-coded smoothed spectrograms of the reference file and the mixed audio file. Using this technique, alignment of the reference file along/within the range of the mixed audio file can be performed with rate mismatches of up to about 2 percent. Fine alignment is then performed employing window-based processing of about 5 to about 10 seconds (s) segments with 500 millisecond (ms) overlap. Fine alignment and rate adjustment within the windows from better than 1 part in 1000 to near-sample-exact alignment can be achieved.

The advantage of using WTA coding for the initial, coarse alignment is that WTA codes allow efficient determination of similarity matches in a large space of possible alignments between the reference and first audio files without having to exhaustively compute a distance measure between the reference and first audio files. Further, use of WTA codes works well with Hough transform-based alignment since an individual match in the WTA space corresponds to the addition of a single line in the Hough space, and, as such, the Hough map can be built incrementally.

In one embodiment, ARC 304 performs alignment and rate adjustment in a two-stage process. The first stage includes coarse alignment and rate determination. ARC 304 first computes wideband spectrograms of the reference file and the mixed audio file. In these embodiments, wideband spectrograms can be spectrograms of high frame rate and a low number of frequency channels or resolution. For example, one frame per 2 ms can be employed with overlapping 4 ms windows on audio that has been downsampled to about 5 kilohertz (kHz). As such, only about 20 samples per window are generated for 10 distinct frequency bands.

Next, ARC 304 can split the spectrogram for each file into short windows containing a small number of spectrogram slices. For example, the window can contain about 7 spectrogram slices. ARC 304 can encode the spectrogram slices into WTA codes with a WTA hash function. In some embodiments, ARC 304 includes a hashing component that employs a hash function to generate a fingerprint using the set of spectrogram slices. The fingerprint can include a set of WTA codes corresponding to respective spectrogram slices.

WTA coding can advantageously summarize the spectrogram short windows in terms of location of relatively large-valued elements. Such pattern descriptors are potentially useful in determining if two short snippets of audio correspond to one another since spectral peak locations are usually robust in the presence of interference. Each short window can therefore be converted to a set of a number of small hash codes. In one embodiment, the hash codes can be 1024 bits, or 256 4-bit codes with each 4-bit code indicating which point is highest out of a predetermined set of $2^4=16$ points in the short window.

As noted above, ARC 304 generates a set of WTA hash codes for each spectrogram frame (e.g., short window center) in the reference file and the mixed audio file. ARC 304 can compare the hash codes using a similarity measure. In some embodiments, ARC 304 can compare the hash codes using bit-wise similarity (e.g., Hamming similarity).

In one embodiment, to find the optimal alignment between the mixed audio file and the reference file by exhaustive search, ARC 304 can compute the similarity of every mixed audio file WTA code with every reference file WTA code and build a two-dimensional graph showing the similarity between the files at each time step. A strong line can appear with an axis-intercept determined by the time offset between the two files and a gradient determined by the relative rate (e.g., rate ratio) between the two files at time steps in embodiments in which there is good alignment between the mixed audio file and the reference file. However, building this representation exhaustively can be computationally intensive as this approach would be similar to cross-correlation via Hamming distance.

In another embodiment, ARC 304 can make use of the WTA hash codes to efficiently find potential locations at which the WTA codes for the files show at least a defined degree or level of similarity. ARC 304 can determine that the locations at which the files have similar WTA codes can correspond to locations at which the spectrograms for the files are similar.

For example, to determine locations at which similarity between the files is present, ARC 304 can employ locality-sensitive hashing (LSH), which relies on tables indexed by hash codes. ARC 304 can make code values that are bigger than 4-bit digits but smaller than 1024-bit full code. In one embodiment, 16-bit codes can be employed. ARC 304 can generate the 16-bit codes by concatenating four 4-bit digits. As used herein, a 16-bit index number can be the address of a location in the index table. Since there can be 1024 bits, the 1024 bits can be divided into 64 16-bit addresses into 64 different tables. ARC 304 can employ the tables to store information indicative of locations in the mixed audio file at which a particular code value was identified since each address maps to zero or more time locations at which that address value appeared in the hash code.

Based on the reference file short windows, ARC 304 can generate corresponding code addresses. ARC 304 can determine, by looking in one or more of the 64 tables, whether a short window in the reference file has a time point that matches a time point in the mixed audio file. In some embodiments, whether a time point is adopted as an alignment between the reference file and the mixed audio file can depend on the number of tables in which the match is found. For example, if a match in time points originates from just one table, ARC 304 can forego using the time point as the alignment of the reference file in the mixed audio file. However, if a time point originates from more than one of the 64 tables, ARC 304 can select the time point as the time offset in the mixed audio file at which the reference file should be aligned. As such, ARC 304 can determine coarse alignment such that the reference file begins at the time offset selected by ARC 304 based on the number of tables at which the time point match is identified. The number of tables that match a particular time offset can also be determined and correspond to the strength of the time offset.

Accordingly, in lieu of ARC 304 computing numerical distance calculations at all possible time offsets and accumulating the calculations in a correlation function and looking for a peak, ARC 304 can review the table to go directly to locations at which peaks might be present. The time point match in a single table can correspond to a zero Hamming distance on one 16-bit part of the code. The time point match in two or more tables can correspond to a low Hamming distance overall, as otherwise it would be very unlikely to have two 16-bit pieces of 1024-bit code to match exactly. Low Hamming distance can be akin to high correlation between the portions of the reference and mixed audio files compared to one another.

In various embodiments, more than one time offset can be determined to be a potential time offset for coarse alignment. For example, time points having matching in more than a defined number of tables can be considered potential coarse alignment time offsets. To determine rate difference between the reference and mixed audio files, ARC 304 can assemble one or more candidate coarse alignment time offsets and rate ratios between the mixed audio file and the reference file. For example, an image map can have two axes, representing number of spectrogram short window time steps in reference file and first audio files. Then, ARC 304 can start with zeros on both axes and drop in the match strength at the x and y locations of the potentially matching reference file and first audio file time offsets per number of tables at which matches were found. Each table lookup would yield zero, one, or a few hits, so a small number of pixels can identify the number of hits as ARC 304 scans along the reference-time dimension. After plotting is complete, random noise and points along a line can be discerned by ARC 304. The line can have a slope near 1 at certain locations and may not have a slope of 1 when rates of the reference and mixed audio files do not match one another. ARC 304 can identify the noise and the line through the use of a Hough transform.

In still other embodiments, ARC 304 can map time points and rate ratios using the Hough transform. For example, in one embodiment, each pair of first audio file time and reference file time can be transformed into a line in the Hough space. The line connects combinations of time offset and rate ratio that could be consistent with those time points aligning. The Hough transform can advantageously be much smaller than the image map described in the previous embodiment since the Hough transform can consider time offsets bounded by information known by the ARC 304. For example, ARC 304 can have information about alignment within 100 ms, so, in some embodiments, ARC 304 can consider time offsets of ±100 ms, or about 100 points total, rather than the full time range of the songs represented by the reference and mixed audio files. The number of points in the other dimension is the number of candidate rate ratios between the reference and mixed audio files. The point can be in increments of 0.002 from 0.96 to 1.04, for example, which is approximately 41 points. So lines are drawn, adding them into a, for example, 100×41 Hough transform accumulator picture instead of putting points into a huge picture that is much larger than 100× 41.

In the resulting Hough transform accumulator image, one or more, or in some embodiments, each point will correspond to a single line in the big image. The line can be characterized by a slope and an offset that specifies a coarse alignment between the mixed audio file and the reference file. A high point value in the Hough transform accumulator image can correspond to a large number of table matches along the corresponding line. Building up multiple lines in the Hough transform accumulator for all the matches between the mixed audio file and the reference file can allow a relatively efficient determination of the optimal combination of time offset and rate ratio between the mixed audio file and the reference file. In one embodiment, to improve the likelihood that the number of matches for consideration remains relatively small, ARC 304 can ignore time offset matches from only a single table of the 64 tables and employ tables that utilize large (e.g., 16-bit) addresses.

After ARC 304 fills the Hough transform accumulator by scanning over the short windows of the reference file, the optimal rate ratio-time offset combination is given by the element in the Hough transform accumulator with the largest value. ARC 304 can identify the maximum value in the Hough transform accumulator and the corresponding time offset and rate ratio can corresponding to the time offset within the mixed audio file at which the reference file should be aligned and the rate ratio according to which the reference file should be adjusted. In embodiments in which there is no clear maximum value, ARC 304 can select one of the largest values randomly or by any number of other approaches including, but not limited to, selecting the maximum value (even if there are other values that are very close in value to the maximum value).

Accordingly, ARC 304 can determine the time offset corresponding to where the sound recording begins in the first audio file. In some embodiments, the rate ratio, a factor near 1 when the rates of the reference file and mixed audio file are an exact match, indicating how much the music in the first audio file has been slowed down or sped up relative to the reference file. Once the ARC 304 has estimated a rate ratio and time offset between the two files, the ARC 304 can adjust (e.g., stretch) the rate of the reference file to match (or substantially match) the rate of the sound recording in the first audio file.

The ARC 304 can then align the reference file to the time in the first audio file corresponding to the location in the first audio file at which the sound recording selected for removal begins. The reference file and the sound recording can be aligned to better than 1 ms employing one or more of the embodiments described herein.

In the second stage, after coarse alignment of reference and mixed audio files, ARC 304 can perform fine alignment by repeating the process on windows of about 5-10 seconds in length. However, fine alignment can be performed to align waveforms (as opposed to alignment of spectrograms, which was performed with coarse alignment).

To perform fine alignment, the coarse alignment steps are repeated on 5 to 10 second windows of the reference file audio and mixed audio file audio waveforms (fine alignment is performed to align the waveforms representations of reference file and mixed audio file while coarse alignment is performed to align the spectrogram representations of reference file and mixed audio file). Specifically, waveform cross-correlation is performed on the 5 to 10 second windows within coarsely aligned windows to determine fine alignment offsets local to the short windows. These local time-to-time correspondences, are then used as input to a Hough transform as described above with coarse alignment to get a consensus for a final offset-rate adjustment for the small window.

Once the rate ratio and time offset are estimated, the reference file audio is rate adjusted (e.g., stretched) to match the rate of the audio in the first audio file audio. The start of the reference file audio is aligned with the first audio file audio.

This two-phase alignment approach, employing coarse alignment on the reference file and mixed audio file using WTA-coded smoothed spectrograms, followed by fine alignment using correlation estimates on small windows within segments identified by coarse alignment) can be useful in recordings having changing delay or other changing conditions. For example, the embodiments for alignment and rate adjustment can be useful for recordings in which the sound recording to be removed is music added to the other audio and originating from a moving video camera with changing delay from the speakers. As another example, the embodiments for alignment and rate adjustment can be useful for recordings generated while the videographer is walking at different speeds during recording.

After alignment by ARC 304, power normalization component 306 can normalize power of the reference file and mixed audio file such that the overall power of the reference file is approximately equal to the overall power of the mixed audio file.

Filtering component 308 can perform adaptive filtering of the reference file in frequency domain to generate a filtered frequency domain representation (FR) of the reference file that has similarity to the sound recording to be removed greater than similarity between the reference file and the sound recording prior to filtering. For example, filtering component 308 can perform adapting filtering of the FR of the reference file to simulate spectral shaping due to playback, room acoustics, microphones, speakers, echoes, which may be present in the sound recording. Via adaptive filtering, filtering component 308 can learn the best filter coefficients to use to filter the reference file at any given point in time. The filter coefficients can change slowly over time so as to account for changing conditions including, but not limited to, changes in level of the sound recording playing in the first audio file, a moving video camera, effects applied to video, and the like. In some embodiments, the FR employed in adaptive filtering is a sequence of complex Discrete Fourier transforms (DFTs) of overlapping windowed segments, and the waveform is reconstructed by performing inverse transforms and overlap-add operations. To minimize edge-wrap sound effects when filtering the FR, the DFT size can be longer than the windowed segment. In some embodiments, the DFT size is longer than the windowed segment by 50%, typically. Filtering component 308 can then filter the reference file thereby generating a filtered reference file.

In one embodiment, in lieu of determining filter coefficients in the time domain, filtering component 308 can determine the filter coefficients in frequency domain. Specifically, filtering component 308 can compute complex spectrograms of the reference file and mixed audio file, then smooth in both time and frequency the power spectrograms of the mixed audio file and the reference file and the complex product of the mixed audio file spectrogram and the reference file spectrograms. Filtering component can employ these smoothed representations to compute the optimal filter in the complex frequency domain as a function of time.

As such, filtering component 308 can smooth complex ratios in time and frequency to determine optimal short filter for matching the reference file to the mixed audio file (or matching the reference file to the portion of the mixed audio file at which the sound recording is located). In some embodiments, this process can be mathematically equivalent to adaptive filtering the reference file in the time domain, but can be much more computationally efficient.

The filtering can be performed on overlapping windowed frames of the reference file, and on overlapping windows of the mixed audio file. For example, filtering component 308 can perform the filtering on windows of 20 ms in length, every 10 ms.

For each frame of the aligned reference and mixed audio files, filtering component 308 can taper the waveform with the window and convert the waveform to the complex frequency domain using a fast Fourier transform (FFT). Filtering component 308 can perform this tapering and conversion to complex frequency domain for aligned reference file and mixed audio file frames.

For each frame converted to the frequency domain, filtering component 308 can then filter the FR of the reference file such that the FR of the reference file approximates the FR of the mixed audio file (or to match the sound recording selected for removal from the mixed audio file).

In one embodiment, to minimize the residual from the subtraction of the filtered FR of the reference file from the FR of the mixed audio file, filtering component 308 can generate a filter having coefficients equal to the ratio of the mixed audio file to the reference file using values from corresponding FFT frequency bins. However, this approach can result in an exact match between the FR of the reference file and the FR of the mixed audio file and exact cancellation except in locations at which FR of the reference file is 0.

Accordingly, filtering component 308 can employ ad hoc smoothing of the generated filter. As the amount of filtering component 308 smoothing of the ratio of the FR of the mixed audio file to the FR of the reference file increases, the likelihood increases that the residual signal output from media editing system 106' will include only the desired signal and remove the sound recording. In some embodiments, filtering component 308 can perform the smoothing is performed in frequency domain (FFT bins within a frame) and time domain (e.g., frame to frame).

Filtering component 308 can determine the optimal amount of smoothing of the filter based on the manner in which the sound recording selected for removal is added to the mixed audio file. For example, in embodiments in which there is echo, filtering component 308 can smooth in a manner resulting in a filter with a frequency domain ripple. However, an echo time longer than an FIR filter will not allow cancellation of the echo in an FIR filter approach while smoothing away the frequency domain ripple will defeat the ability to cancel the echo. As such, filtering component 308 can take such factors into consideration to determine the best filter given the manner in which the sound recording was added.

Filtering component 308 can filter the FR of the reference file with the generated filter. For example, filtering component 308 can generate the filtered version of the FR of the reference file by multiplying the set of complex numbers representative of the filter components by the complex values associated with the FR of the reference file.

First subtraction component 310 can compute the residual content by subtracting the filtered version of the FR of the reference file from the FR of the mixed audio file at each FFT bin. In some embodiments, the residual content includes only the elements of the FR of the mixed audio file audio that are not correlated to the FR of the reference file. In some embodiments, the residual content can be the FR of a second audio file (or a portion thereof) or an intermediate second audio file (or a portion thereof). For example, the residual content can be the second audio file that is then embedded in the media file in place of the mixed audio file. However, in other embodiments, the resultant signal is an intermediate second audio file that is further processed by second subtraction component 312 to remove residual remaining in the output from first subtraction component 310.

Time-frequency conversion component 314 can convert the FR of the second audio file (or intermediate second audio file) to the time representation of the second audio file (or the intermediate second audio file). For example, in some embodiments, time-frequency conversion component 314 can perform an inverse transform on the FR of the second audio file (or the intermediate second audio file) to generate a time representation of the segment of the second audio file (or the intermediate second audio file) processed by filtering component 308. Time-frequency conversion component 314 can then re-taper the edges of the second audio file (or the intermediate second audio file) to re-create the original windowed section processed by filtering component 308. Time-frequency conversion component 314 can then overlap and add the segments to get the cleaned second audio file (or the intermediate second audio file).

In some embodiments, processing component 300 also include second subtraction component 312. In this embodiment, second audio file can be considered the intermediate second audio file described with reference to time-frequency conversion component 314. Second subtraction component 312 can perform spectral subtraction in the frequency domain on the FR of the intermediate second audio file to remove to remove additional energy at one or more time-frequency regions at which the reference file energy was removed by first subtraction component 310. In some embodiments, the FR employed in spectral subtraction is a sequence of complex DFTs of overlapping windowed segments, and the waveform is reconstructed by performing inverse transforms and overlap-add operations. To minimize edge-wrap sound effects, the DFT size can be longer than the windowed segment. The DFT size can be longer than the windowed segment by 50%, typically. Accordingly, second subtraction component 312 can generate an enhanced FR of the second audio file (relative to the version of the FR of the second audio file not processed with second subtraction component 312). The enhanced FR of the second audio file can have information such as that remaining from the sound recording removed.

In some embodiment, the subtraction performed by second subtraction component 312 can be spectral subtraction implemented employing one or more signal processing algorithms in the frequency domain. In various embodiments, spectral subtraction can include non-linear or non-coherent subtraction. For example, non-coherent subtraction can be based on a power spectrum (e.g., a power spectrum of the intermediate second audio file).

In some embodiments, second subtraction component 312 can determine a spectrogram for the intermediate second audio file. Second subtraction component 312 can compare one or more segments of the sound recording selected for removal with one or more corresponding segments of the intermediate second audio file to generate the second audio file. For example, second subtraction component 312 can find one or more segments of the sound recording selected for removal that are spectrally similar to one or more segments of the intermediate second audio file. In one example, the one or more segments for each can be spectro-temporal segments. As such, the level of individual frequency bands can be modified within a short temporal slice of the sound recording selected for removal and/or the intermediate second audio file to generate the second audio file. Second subtraction component 312 can split the spectrogram into magnitude and phase.

To generate the second audio file, second subtraction component 312 can adjust and/or reduce a power level of the intermediate second audio file based on a correlation, spectral similarity or the like of the one or more segments of the sound recording selected for removal with the one or more segments of the intermediate second audio file. For example, to generate the second audio file, second subtraction component 312 can adjust and/or reduce a power level of at least one of the one or more segments of the intermediate second audio file based on spectral correlation of the one or more segments of the sound recording selected for removal with the one or more segments of the intermediate second audio file. In one example, to generate the second audio file, the power level of a particular corresponding segment of the one or more segments of the intermediate second audio file can be reduced to zero in response to a determination that remaining sound in the residual audio of the sound recording selected for removal is not relevant (e.g., remaining sound in the residual audio of the sound recording selected for removal is below a predetermined threshold level). For example, to generate the second audio file, the power level of a particular corresponding segment of the one or more segments of the intermediate second audio file can be reduced to zero based on a relevancy level of the particular segment of the sound recording selected for removal.

Second subtraction component 312 can compare a magnitude of the one or more segments of the sound recording selected for removal with a corresponding magnitude of the one or more corresponding segments of the intermediate second audio file. Therefore, one log magnitude spectrum segment (e.g., slice) of the sound recording selected for removal can be subtracted from one log magnitude spectrum segment (e.g., slice) of the intermediate second audio file to generate the second audio file. Additionally, variance of the remainder (e.g., as a result of the subtraction) can be determined to generate the second audio file. For low-variance segments (e.g., slices), the average level of the remainder can be determined to generate the second audio file.

In one example, second subtraction component 312 can compare the one or more segments of the sound recording selected for removal with the one or more corresponding segments of the intermediate second audio file using a short-time Fourier transform (STFT) algorithm. Therefore, the power level of the intermediate second audio file can be selectively reduced as a function of a spectral correlation to generate the second audio file. As such, second subtraction component 312 can reduce a power level for different time frequency bins (e.g., reduce power at different frequencies) of the intermediate second audio file to generate the second audio file. Second subtraction component 312 can re-synthesize the intermediate second audio file using the subtracted magnitude spectrum and the original phase of the intermediate second audio file to generate the second audio file. As such, the sound recording selected for removal can be removed from the intermediate second audio file (e.g., the intermediate second audio file can be re-processed without the sound recording selected for removal) to generate the second audio file. Therefore, one or more songs can be removed from the first audio file while preserving non-song audio resulting in the second audio file. It is to be appreciated that another type of correlation or reductions in power level can be implemented by second subtraction component 312 to remove the sound recording selected for removal from the intermediate second audio file thereby resulting in the second audio file. It is also to be appreciated that other types of signal processing algorithms can be used to remove the sound recording from the intermediate second audio file thereby resulting in the second audio file.

As described above, time-frequency conversion component 314 can generate a time representation of the second audio file.

Modification component 318 can embed the second audio file in the media file in which first audio file was initially embedded upon receipt at or access by media editing system 106'.

Communication component 316 can output the second audio file and/or a media file having the second audio file embedded in the media file. For example, communication component 316 can output the second audio and/or the media file with the second audio file embedded in the media file and transmit the waveform to the user, store the waveform and/or otherwise output the waveform for playback by a user device, such as user device 102.

Processor 320 can perform or facilitate performance of one or more of the functions described herein with reference to media editing system 106' or processing component 300 (and/or any components thereof). For example, processor 320 can facilitate signal processing of the reference file and/or the mixed audio file to generate the second audio file, determination of alignment and rate adjustment between the reference file and the mixed audio file, generation of an optimal filter for filtering the reference file, subtraction of the reference file from the first audio file, time-frequency conversion and like.

Memory 322 can store information transmitted to, received by and/or processed by media editing system 106' and/or processing component 300. In various embodiments, memory 322 can store information including, but not limited to, the coefficients for the filter employed for filtering the reference file, coarse alignment information, fine alignment information, Hough space information, WTA code information and the like.

Figure 4A:
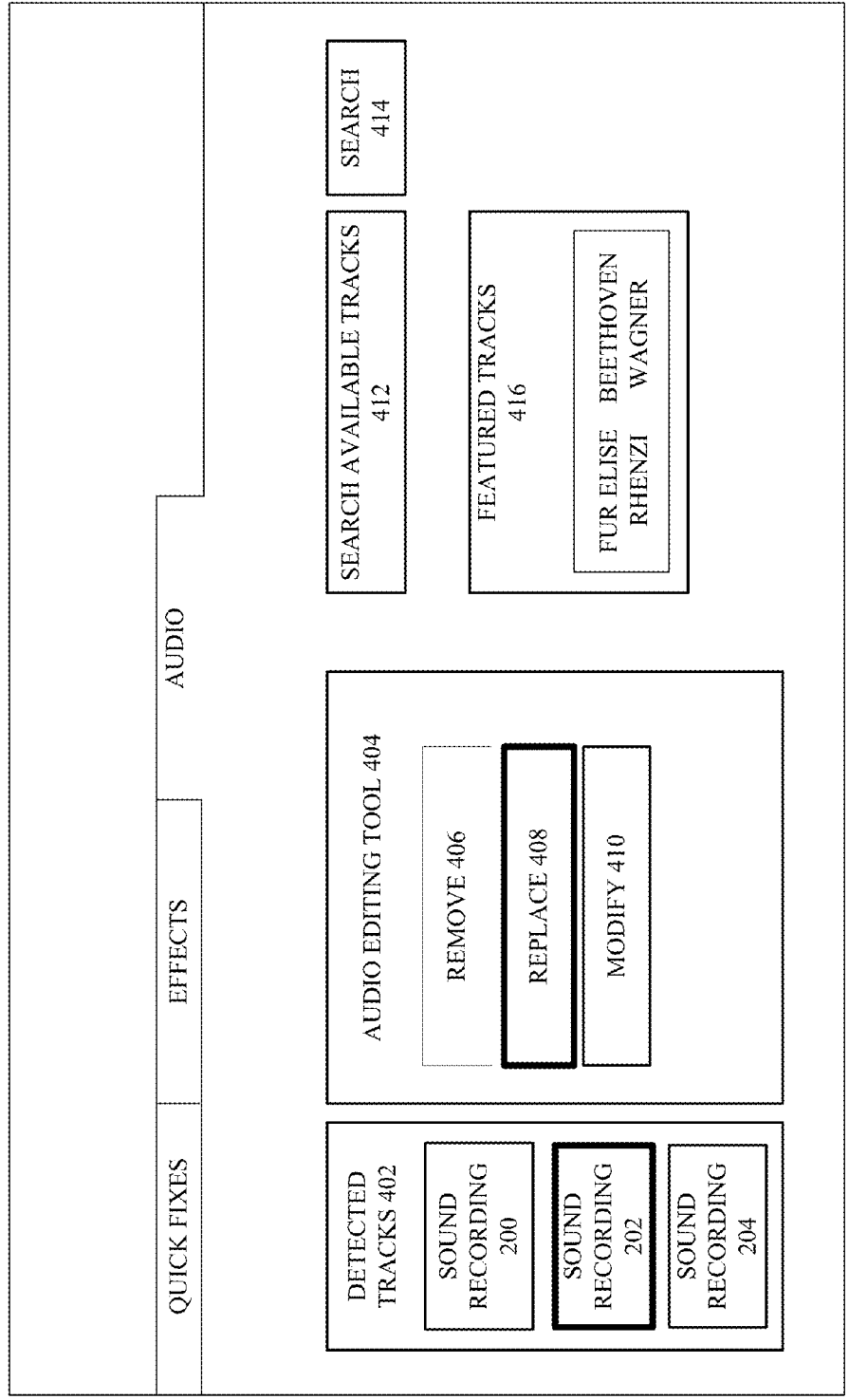
FIGS. 4A and 4B are illustrations of non-limiting user interfaces for a media editing system that facilitates selective modification of audio content in a mixed audio recording in accordance with one or more embodiments described herein.
Figure 4B:
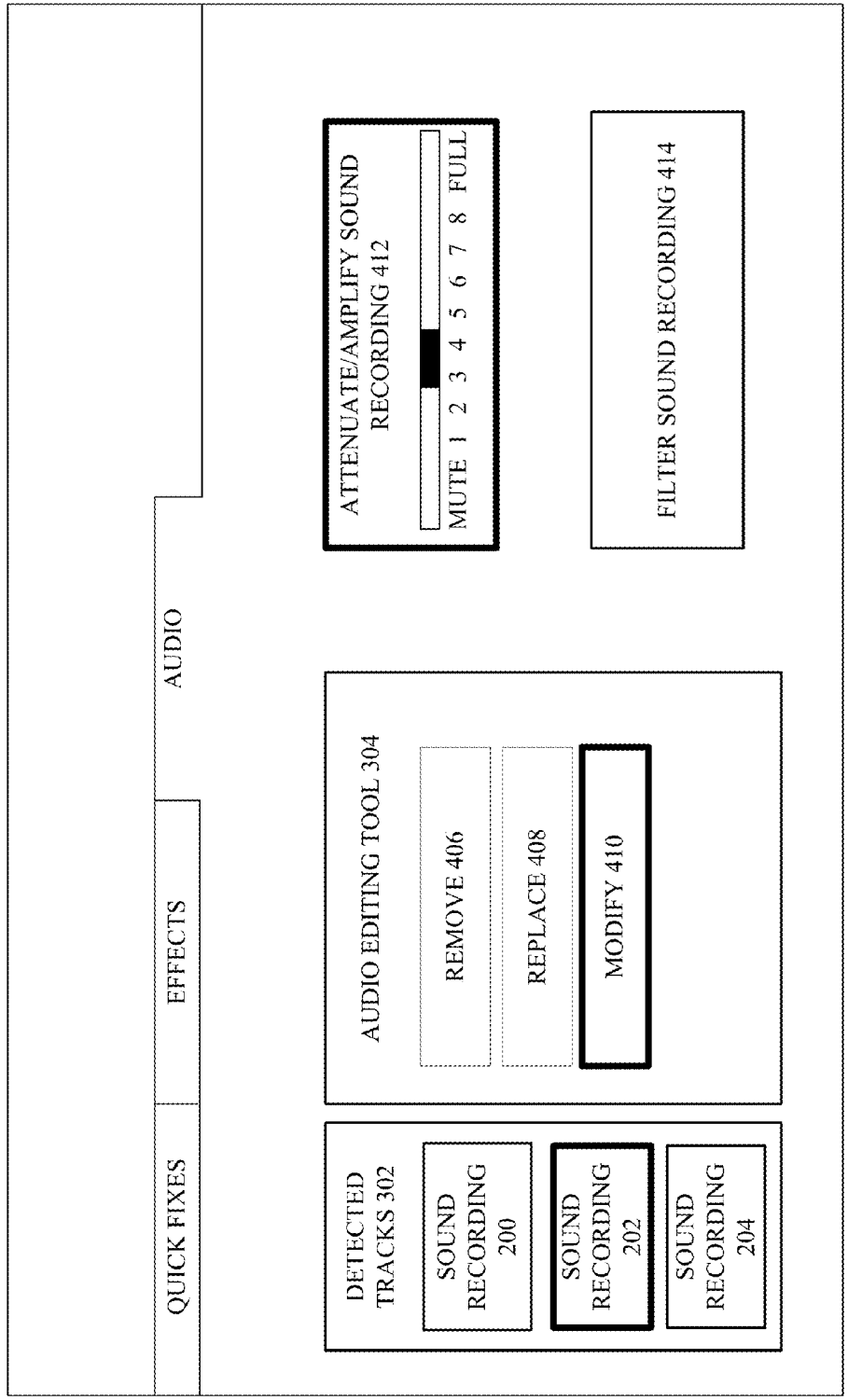

FIGS. 4A and 4B are illustrations of non-limiting user interfaces for a media editing system that facilitates selective modification of audio content in a mixed audio recording in accordance with one or more embodiments described herein. The media editing system for which user interface 400 will be shown and described can be media editing system 106, 106' in various embodiments. Repetitive description of like elements employed in other embodiments described herein is omitted for sake of brevity.

Turning first to FIG. 4A, user interface 400 can include a first display region 402 that can display information identifying and/or describing one or more detected tracks of a mixed audio recording received at and/or accessed by a media editing system. For example, the media editing system can identify and/or describe sound recordings 200, 202, 204 embedded in the mixed audio recording. In various embodiments, the information displayed can be a title and/or author of the sound recording, a type of audio recording (e.g., speech audio, music audio) or any number of other different ways to identify and/or describe sound recordings in a mixed audio recording. In some embodiments, for example, if user interface 400 is a touch screen user interface, one or more of sound recordings 200, 202, 204 can be selected by user activation of a portion of user interface at which the information identifying and/or describing sound recordings 200, 202, 204 is located. In other embodiments, user interface 400 can display information and the media editing system of user interface 400 can receive inputs via keyboard, mouse or the like.

User interface 400 can also include a second display region 404 that displays information associated with audio editing functionality of the media editing system. For example, as shown, display regions 406, 408, 410 display information identifying removal, replacement and modification functions, respectively.

In various embodiments, users can specify one or more different desired edits to one or more sound recordings. For example, in the example shown, sound recording 202 is selected for replacement with another track. User interface 400 can provide a text box 412 that can receive alphanumeric information specifying a title, author or other identifying information for a track for which the user is searching for replacement of sound recording 202 in the mixed audio recording. In some embodiments, the search is commenced upon receipt of the alphanumeric information in text box 412. In other embodiments, the search is commenced upon activation of the search activation region 414 after receipt of the alphanumeric information in text box 412.

In some embodiments, user interface 400 can display one or more featured tracks at display region 416. The featured tracks can be selected for replacement of sound recording.

Accordingly, user interface 400 can facilitate addressing copyright issues brought to the attention of a user and/or mitigate the likelihood of receipt of an unauthorized use allegation by enabling replacement of various sound recordings with other sound recordings. User interface 400 can also facilitate general editing by allowing users to replace unwanted sound recordings with more desirable sound recordings.

Turning now to FIG. 4B, sound recording 202 can be selected and display region 410 can be activated for modification of sound recording 202. In this embodiment, user interface 400 can provide display region 412 to enable a user to attenuate or amplify a sound recording and/or display region 414 to enable a user to filter a sound recording.

In some embodiments, as shown at display region 412, the volume of sound recording 202 relative to other sound recordings in the mixed audio recording can be adjusted to diminish or cause sound recording 202 to be more prominent within the mixed audio recording. As shown, the volume of sound recording 202 can be reduced to a level such that the sound recording is effectively muted in some embodiments, increased to the maximum volume possible for the sound recording in other embodiments, or adjusted to a volume between the two extremes, in other embodiments.

Accordingly, the media editing system described herein can enable content to be attenuated or amplified as desired by the user of the media editing system. For example, if sound recording 202 includes airplane or train noise, the noise can be muted by the media editing system as dictated by the user via user interface 400.

Although not selected, in some embodiments, display region 414 can facilitate filtering of a sound recording. For example, a particular sound recording can be extracted for dubbing. As another example, a particular sound recording can be process to remove defects that diminish sound quality of the sound recording.

Although user interface 400 is described as a user interface for a media editing system, in various embodiments, there can be desktop, laptop, tablet, and mobile device versions of user interface 400 to account for and optimize utilization of the screen for these different devices.

FIGS. 5, 6, 7, 8, 9, 10 and 11 are illustrations of non-limiting flow diagrams of methods that facilitate selective removal of audio content from a mixed audio recording in accordance with one or more embodiments described herein. One or more of methods 500, 600, 700, 800, 900, 1000, 1100 can be utilized in various systems including, but not limited to, network systems, computer network systems, communication systems, router systems, server systems, high availability server systems (e.g., Telecom server systems), web server systems, file server systems, media server systems, disk array systems, powered insertion board systems and/or cloud-based systems.

Figure 5:
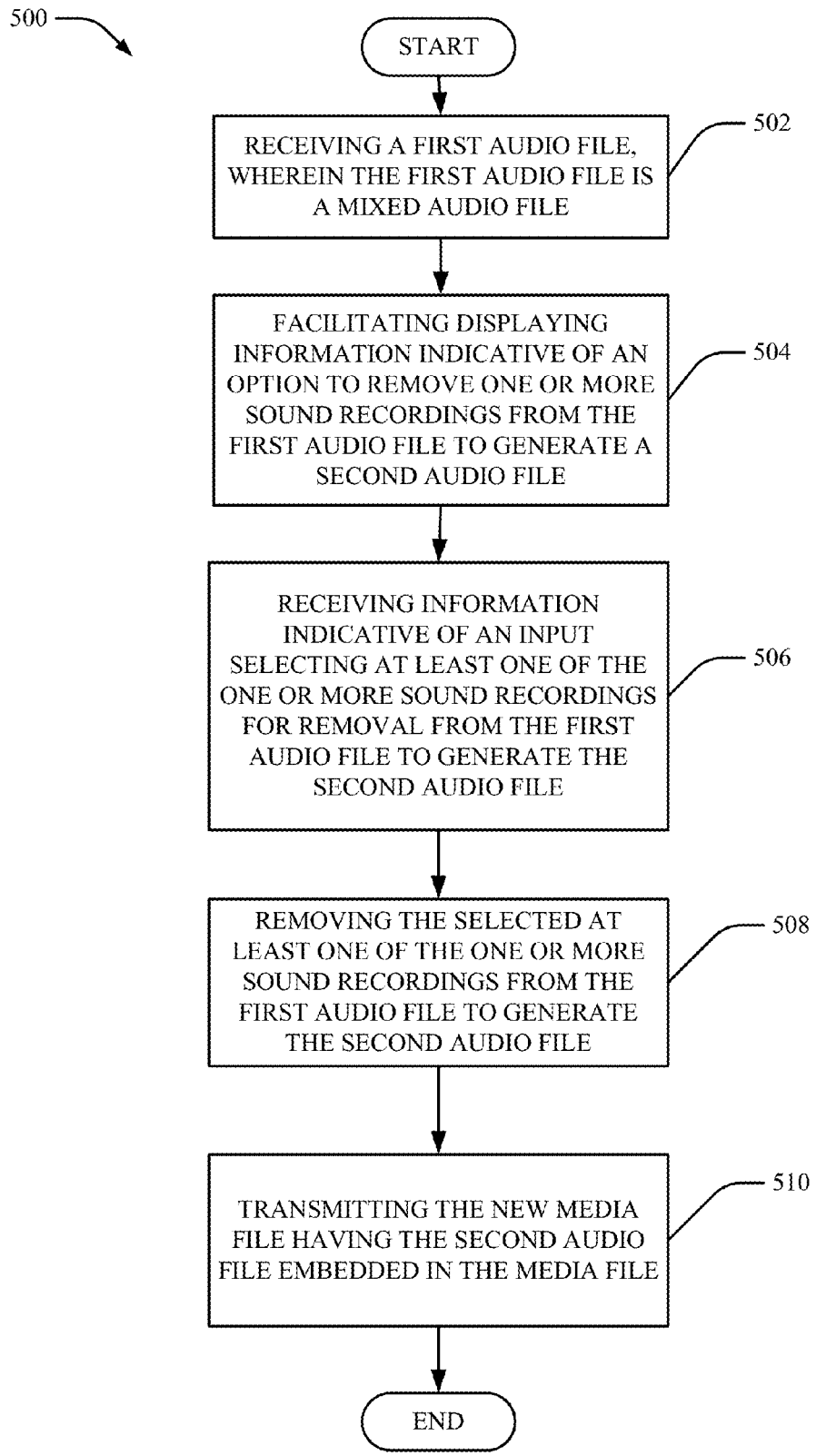
FIGS. 5, 6, 7, 8, 9, 10 and 11 are illustrations of non-limiting flow diagrams of methods that facilitate selective removal of audio content from a mixed audio recording in accordance with one or more embodiments described herein.

Turning first to FIG. 5, at 502, method 500 can include receiving a first audio file, wherein the first audio file is a mixed audio file (e.g., using communication component 316 of media editing system 106'). In various embodiments, the mixed audio file can be received by communication component 316 from a computing device (e.g., user device 102), over a network (e.g., network 108) from a media server (e.g., media server 110) or the like.

In various embodiments, the mixed audio file can be different types of audio files including, but not limited to, speech files, music files or any combination thereof. Further, the mixed audio file can be embedded in any number of different types of media files including, but not limited to, video files. For example, the mixed audio file can be embedded in a video file such that the entirety of the file can include a video having background music and a speech being recited over the background music.

At 504, method 500 can include facilitating displaying information indicative of an option to remove one or more sound recordings from the first audio file to generate a second audio file (e.g., using communication component 316 of media editing system 106'). The sound recording can be speech information in the mixed audio file or music in the mixed audio file, for example. The information indicative of the option to remove one or more sound recordings can be information indicative of options to remove speech or music from the mixed audio file embedded in the media file. The user can select speech or music for removal from the mixed audio file.

At 506, method 500 can include receiving information indicative of an input selecting at least one of the one or more sound recordings for removal from the first audio file to generate the second audio file (e.g., using communication component 316 of processing component 300). For example, communication component 316 can receive information causing media editing system 106' to remove a copyrighted speech in a video, for example.

At 508, method 500 can include removing the selected at least one of the one or more sound recordings from the first audio file to generate the second audio file (e.g., using media editing system 106'). The second audio file can include approximately all content from the first audio file with the selected one or more sound recordings removed. For example, if music is selected for removal from a mixed audio file having speech and music, the second audio file can be a file having speech from the first audio file. In some embodiments, some portions of music can remain based on inability to remove all portions of the music with perfect cancellation.

At 410, method 400 can include transmitting the new media file having the second audio file embedded in the media file (e.g., using communication component 316). The new media file can be transmitted to a user device for playback and/or stored in various embodiments.

Figure 6:
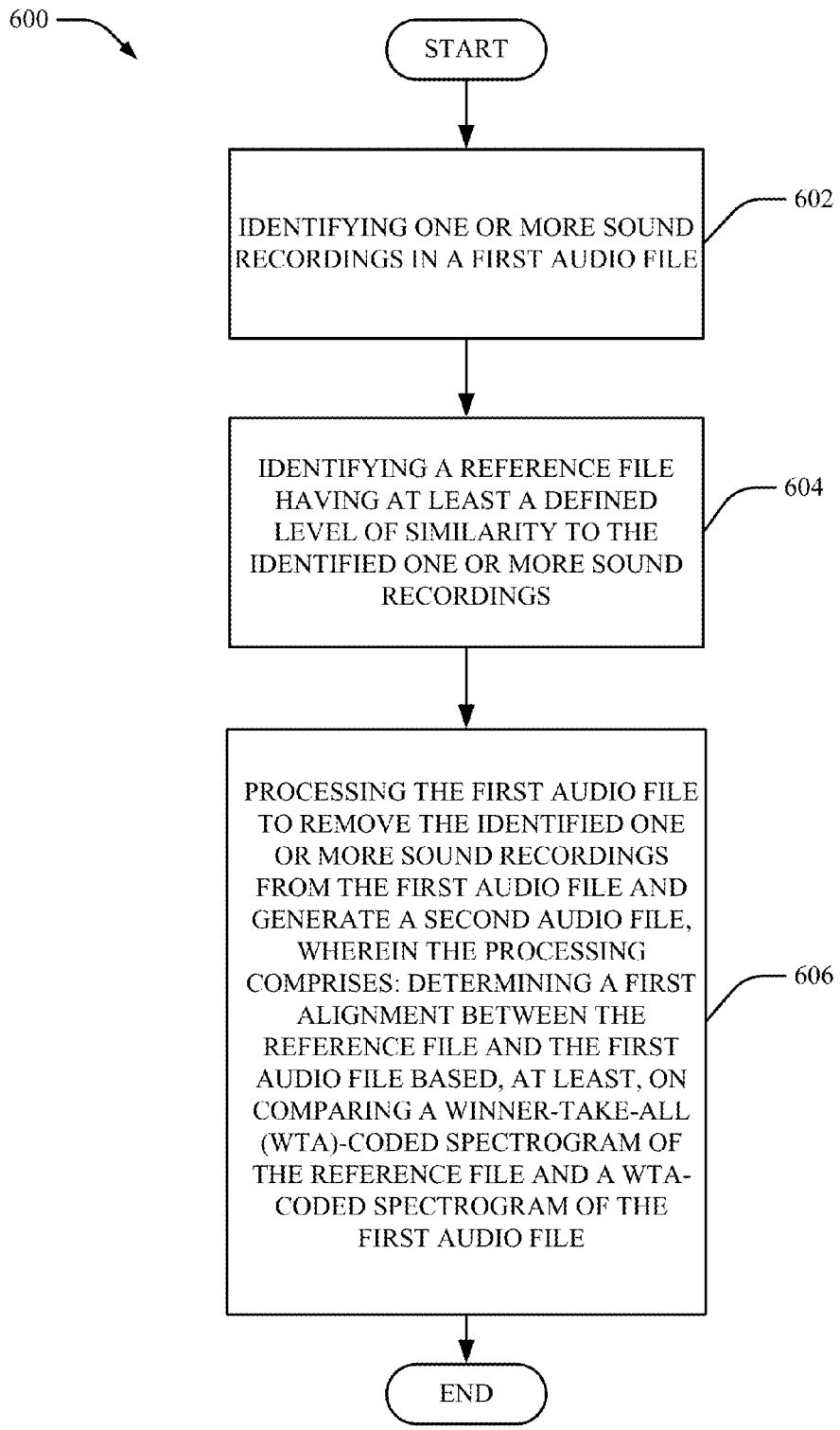

Turning now to FIG. 6, method 600 is a method of processing a first audio file to remove selected content and thereby generate a second audio file. At 602, method 600 can include identifying one or more sound recordings in a first audio file (e.g., using identification component 302 of processing component 300).

At 602, method 600 can include identifying a reference file having at least a defined level of similarity to the identified one or more sound recordings (e.g., using identification component 302).

At 604, method 600 can include processing the first audio file to remove the identified one or more sound recordings from the first audio file and generate a second audio file (e.g., using processing component 300). In some embodiments, the processing includes determining alignment and rate adjustment between the reference file and the first audio file based, at least, on comparing a WTA-coded spectrogram of the reference file and a WTA-coded spectrogram of the first audio file (e.g., using ARC 304 of processing component 300) and mapping candidate time offsets and candidate rate ratios into Hough space.

Figure 7:
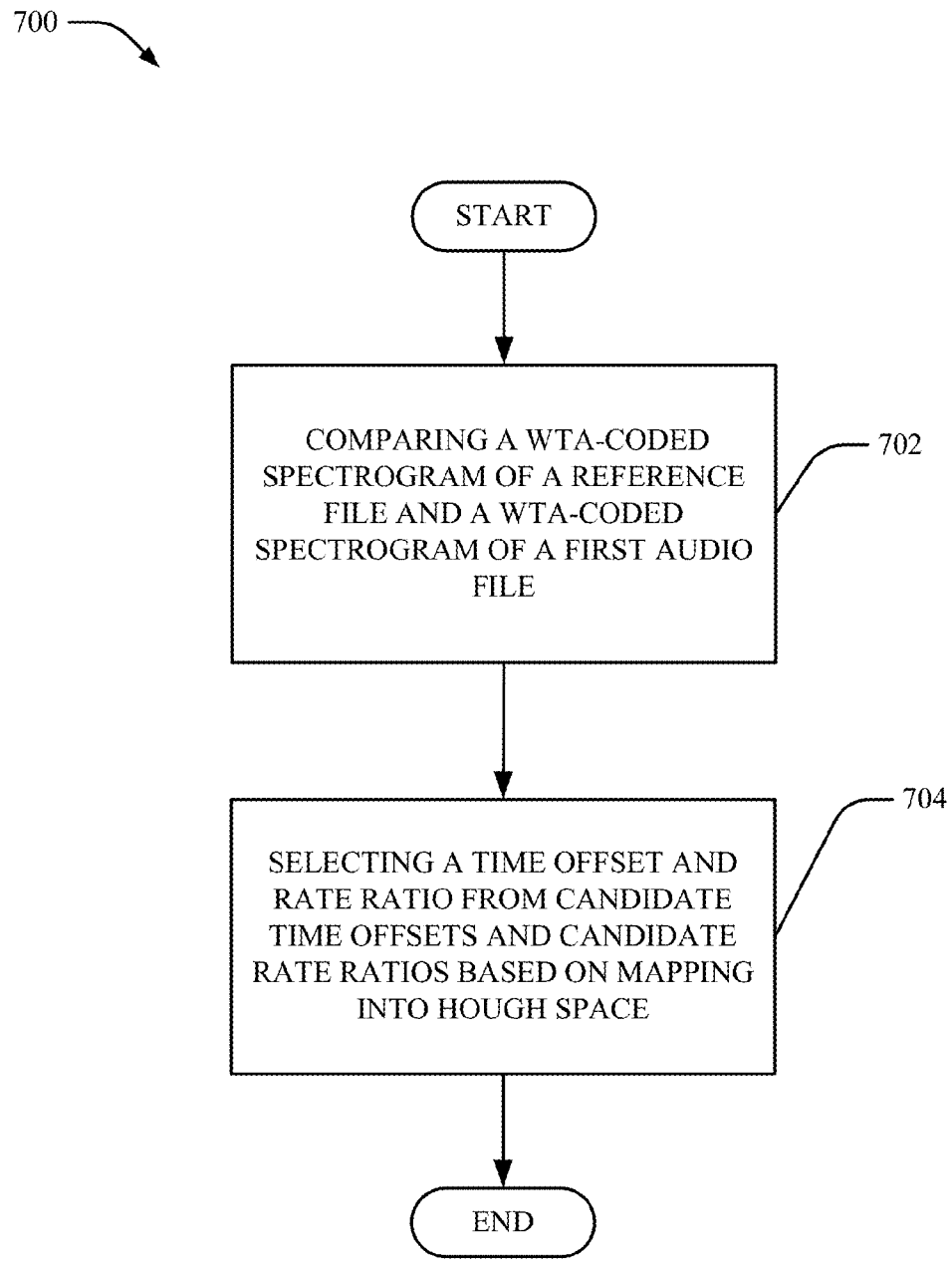

Turning now to FIG. 7, method 700 is a method of performing alignment and rate adjustment to efficiently remove the selected sound recording from the first audio file. At 702, method 700 can include comparing a WTA-coded spectrogram of a reference file and a WTA-coded spectrogram of a first audio file (e.g., using ARC 304). At 704, method 700 can include selecting a time offset and rate ratio between the reference file and the first audio file from candidate time offsets and candidate rate ratios based on mapping into Hough space (e.g., using ARC 304).

Figure 8:
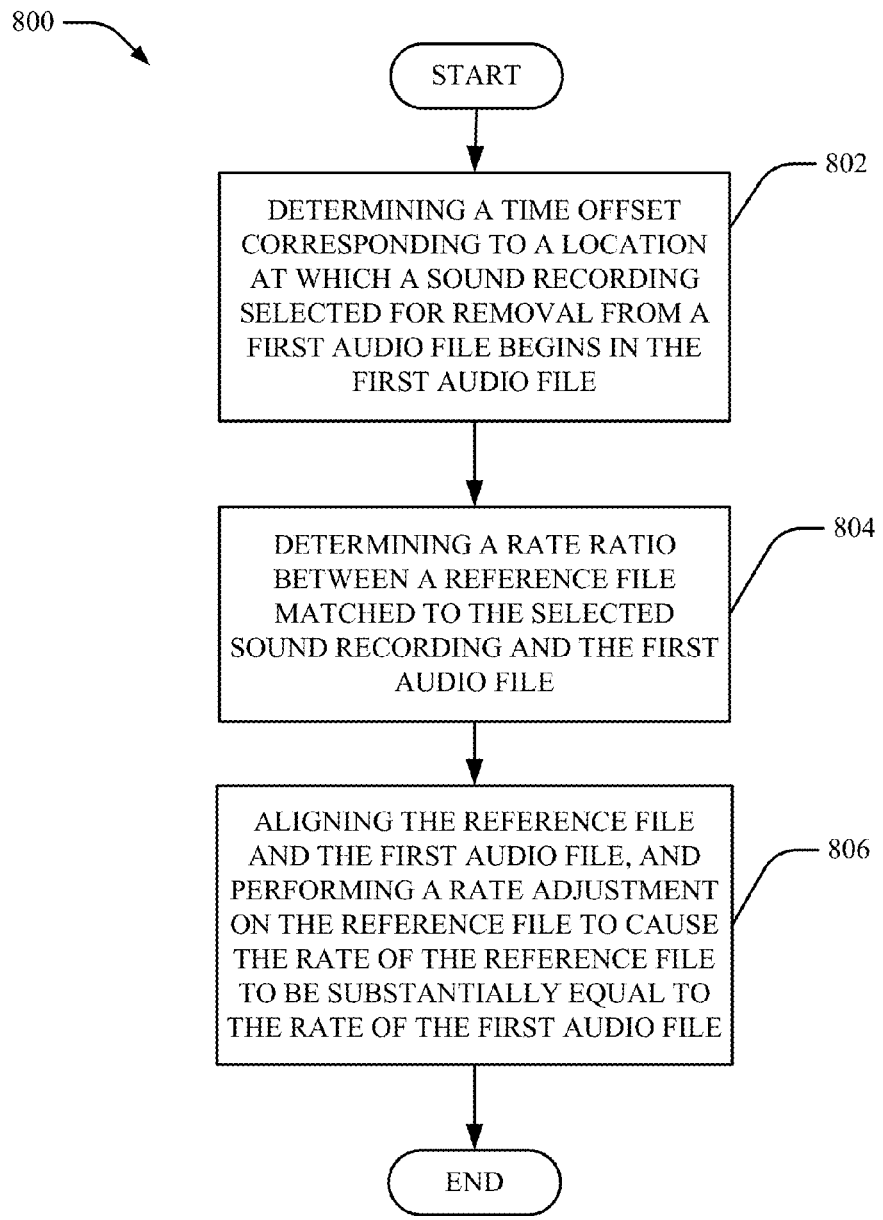

Turning now to FIG. 8, at 802, method 800 can include determining a time offset corresponding to a location at which a sound recording selected for removal from a first audio file begins in the first audio file (e.g., using ARC 304).

At 804, method 800 can include determining a rate ratio between a reference file matched to the sound recording and the first audio file (e.g., using ARC 304). The rate ratio can be a numerical value representative of the rate of the reference file compared to the rate of the first audio file. For example, if the reference file and the first audio file have equal rates, the rate ratio can be determined to be 1. The rate ratio can be less than or greater than 1 depending on if the rate of the reference file is less than or greater than the rate of the first audio file, respectively.

At 806, method 800 can include aligning the reference file and the first audio file, and performing a rate adjustment on the reference file to cause the rate of the reference file to be substantially equal to the rate of the first audio file (e.g., ARC 304). For example, in some embodiments, once the rate ratio has been determined, the reference file is stretched (or compressed) to match the rate of the first audio file.

Figure 9:
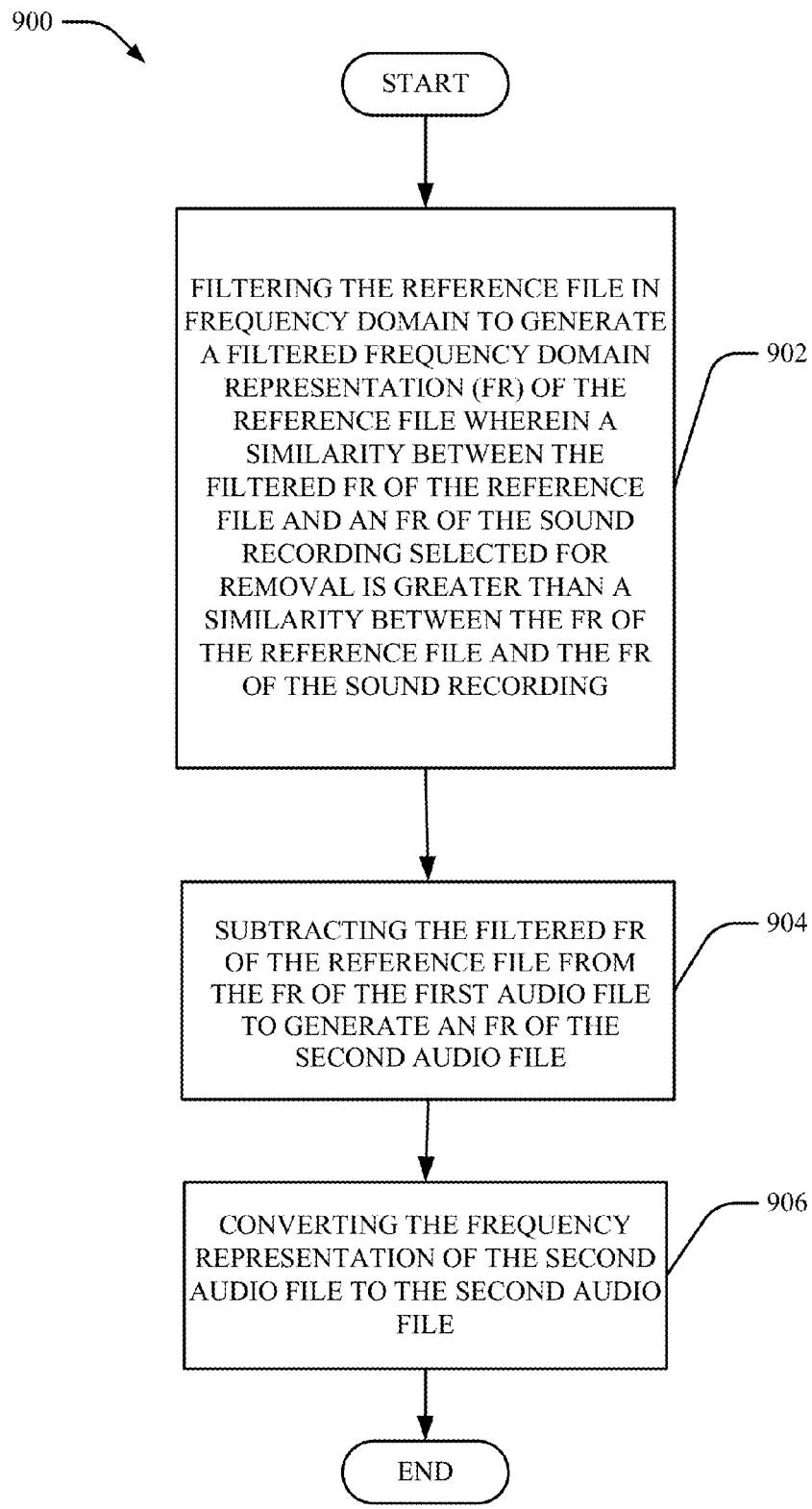

Turning now to FIG. 9, at 902, method 900 can include filtering the reference file in frequency domain to generate a filtered FR of the reference file wherein a similarity between the filtered FR of the reference file and an FR of the sound recording selected for removal is greater than a similarity between the FR of the reference file and the FR of the sound recording (e.g., using filtering component 308). The adaptive filtering attempts to find the optimal filter to apply to the reference file that makes the sound recording reference filter, upon filtering, correspond as closely as possible to the sound recording selected for removal from the first audio file.

At 904, method 900 can include subtracting the filtered FR of the reference file from the FR of the first audio file to generate an FR of the second audio file (e.g., using first subtraction component 310). In some embodiments, at each FFT bin, the output from first subtraction component 310 (e.g., the FR of the second audio file) is approximately equal to the FR of the corresponding segment of the first audio file with the filtered FR of the reference file removed from the first audio file.

At 906, method 900 can include converting the FR of the second audio file to the second audio file (e.g., using time-frequency conversion component 314). In some embodiments, the time-frequency conversion component 314 can process the FR of the second audio file with an inverse transform to generate one or more segments of the second audio file. Segment edges can be re-tapered and segments can be overlapped and added to re-create an entire second audio file waveform.

Figure 10:
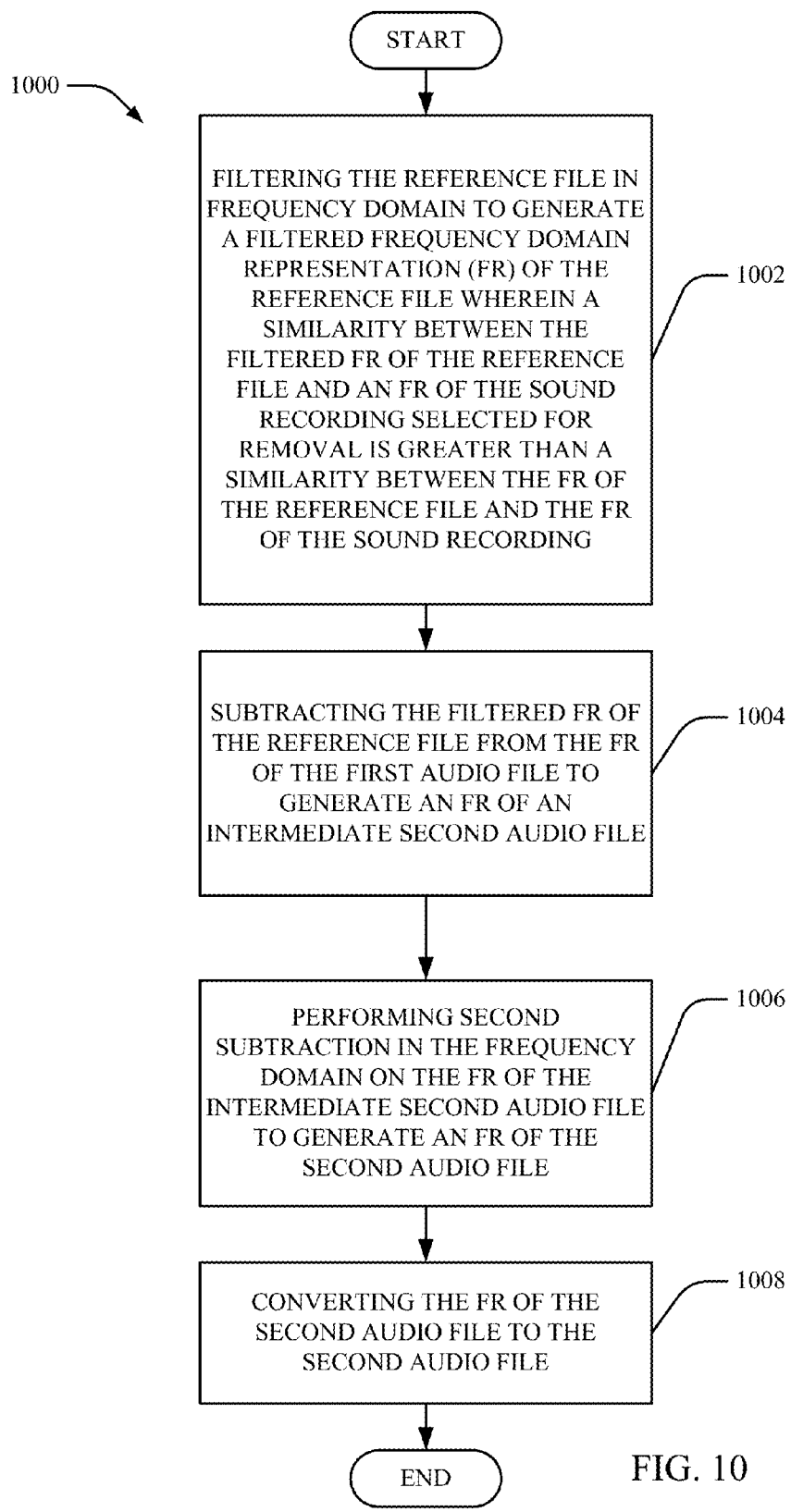

Turning now to FIG. 10, at 1002, method 1000 can include filtering the reference file in frequency domain to generate a filtered FR of the reference file wherein a similarity between the filtered FR of the reference file and an FR of the sound recording selected for removal is greater than a similarity between the FR of the reference file and the FR of the sound recording (e.g., using filtering component 308).

At 1004, method 1000 can include subtracting the filtered FR of the reference file from the FR of the first audio file to generate an FR of an intermediate second audio file (e.g., using first subtraction component 310). In some embodiments, at each FFT bin, the output from the first subtraction component (e.g., the FR of the intermediate second audio file) is approximately equal to the FR of the corresponding segment of the first audio file with the filtered FR of the reference file removed from the first audio file.

At 1006, method 1000 can include performing second subtraction in the frequency domain on the FR of the intermediate second audio file to generate an FR of the second audio file (e.g., using second subtraction component 312). The second subtraction can be spectral subtraction in one or more embodiments.

At 1008, method 1000 can include converting the FR of the second audio file to the second audio file (e.g., using time-frequency conversion component 314).

Figure 11:
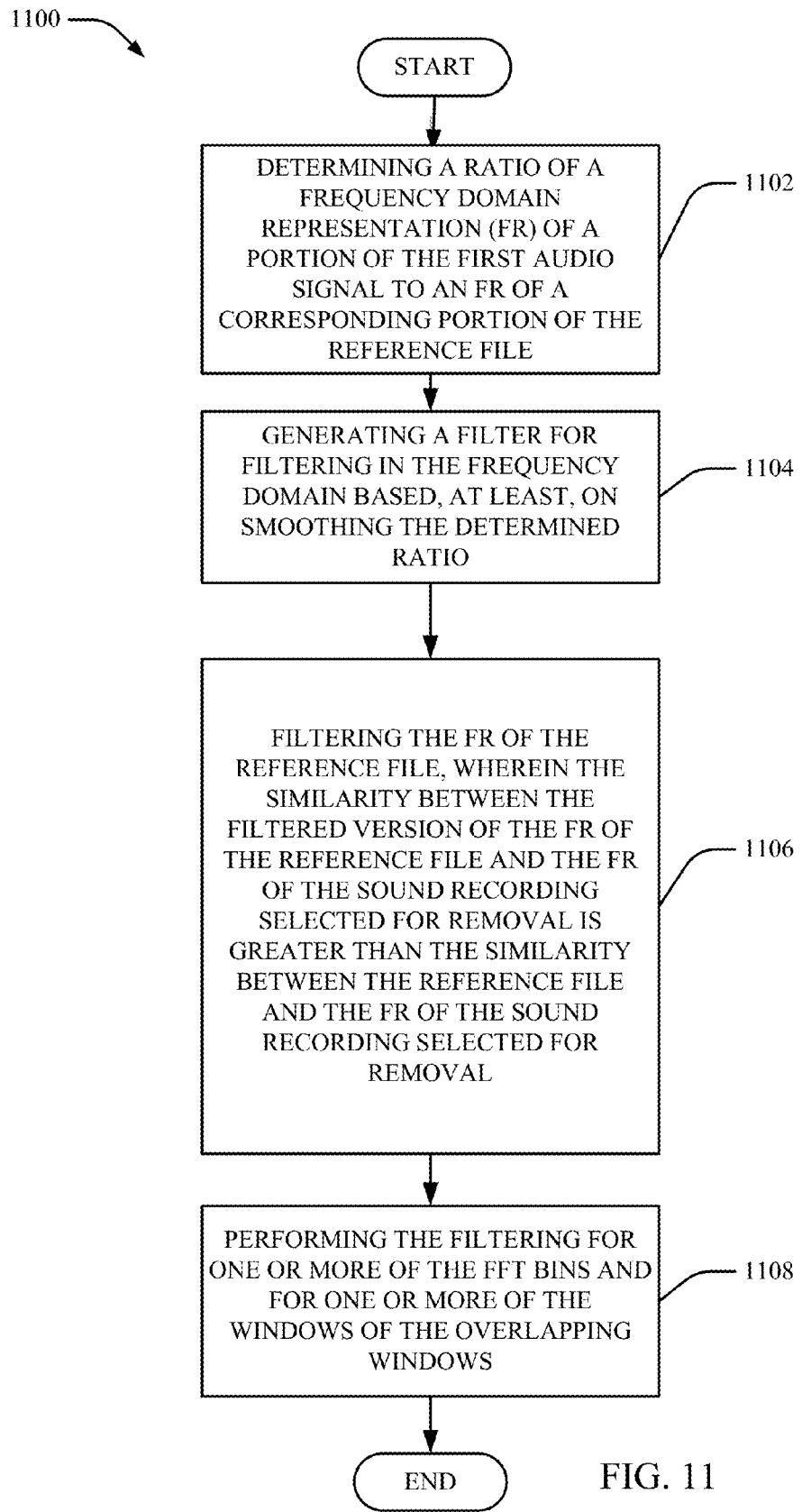

Turning now to FIG. 11, at 1102, method 1100 can include determining a ratio of a FR of a portion of the first audio signal to a FR of a corresponding portion of the reference file (e.g., using filtering component 308).

At 1104, method 1100 can include generating a filter for filtering in the frequency domain based, at least, on smoothing the determined ratio (e.g., using filtering component 308).

At 1106, method 1100 can include filtering the FR of the reference file, wherein the similarity between the filtered version of the FR of the reference file and the FR of the sound recording selected for removal is greater than the similarity between the reference file and the FR of the sound recording selected for removal (e.g., using filtering component 308).

At 1108, method 1102 can include performing the filtering for one or more of the FFT bins and for one or more of the windows of the overlapping windows (e.g., using filtering component 308).

Example Operating Environments

Figure 12:
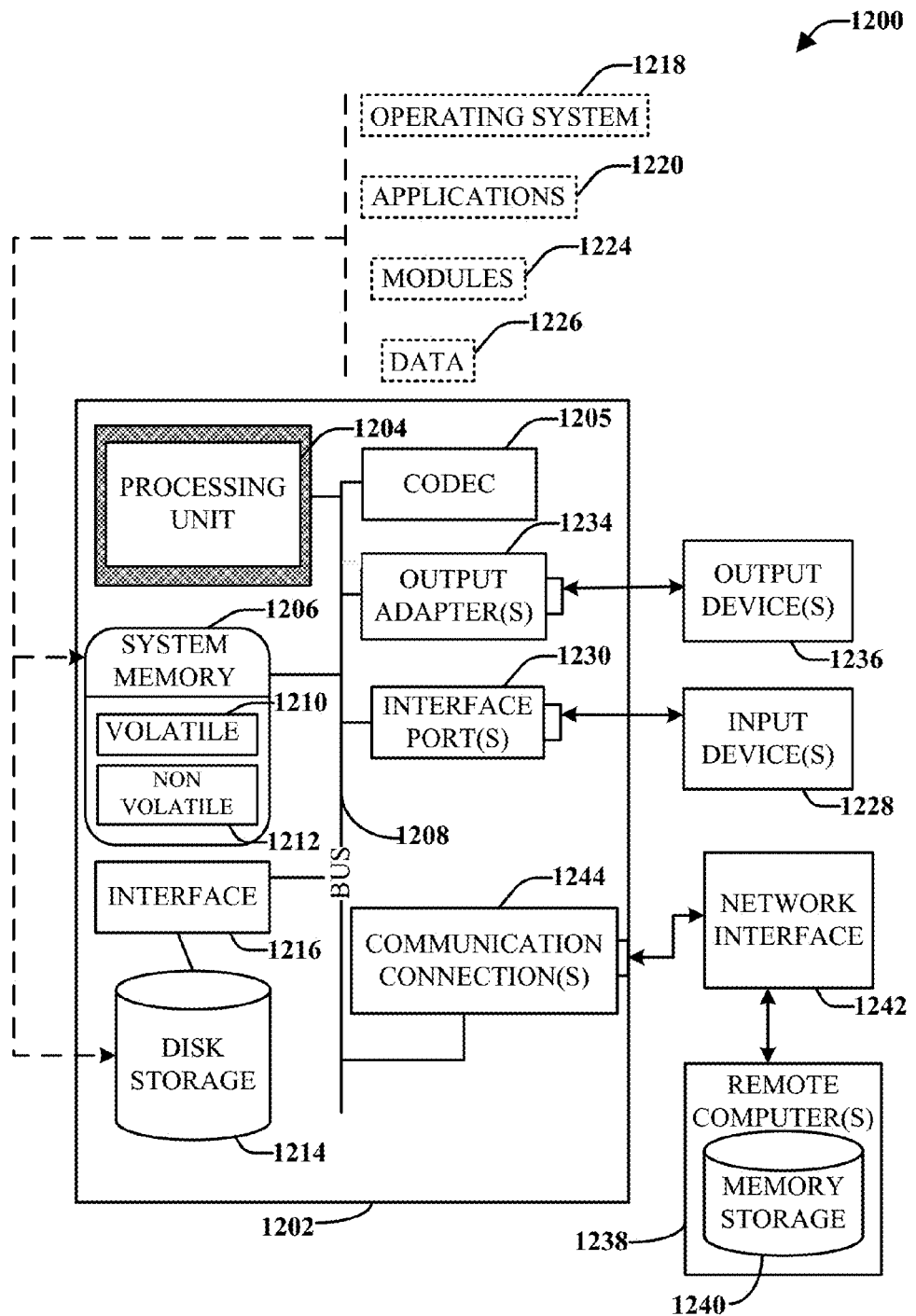
FIG. 12 is an illustration of a schematic diagram of a non-limiting operating environment for implementing one or more embodiments described in this disclosure.

FIG. 12 is an illustration of a schematic diagram of a non-limiting operating environment for implementing one or more embodiments described in this disclosure. The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to one or more embodiments, codec 1205 may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s). Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
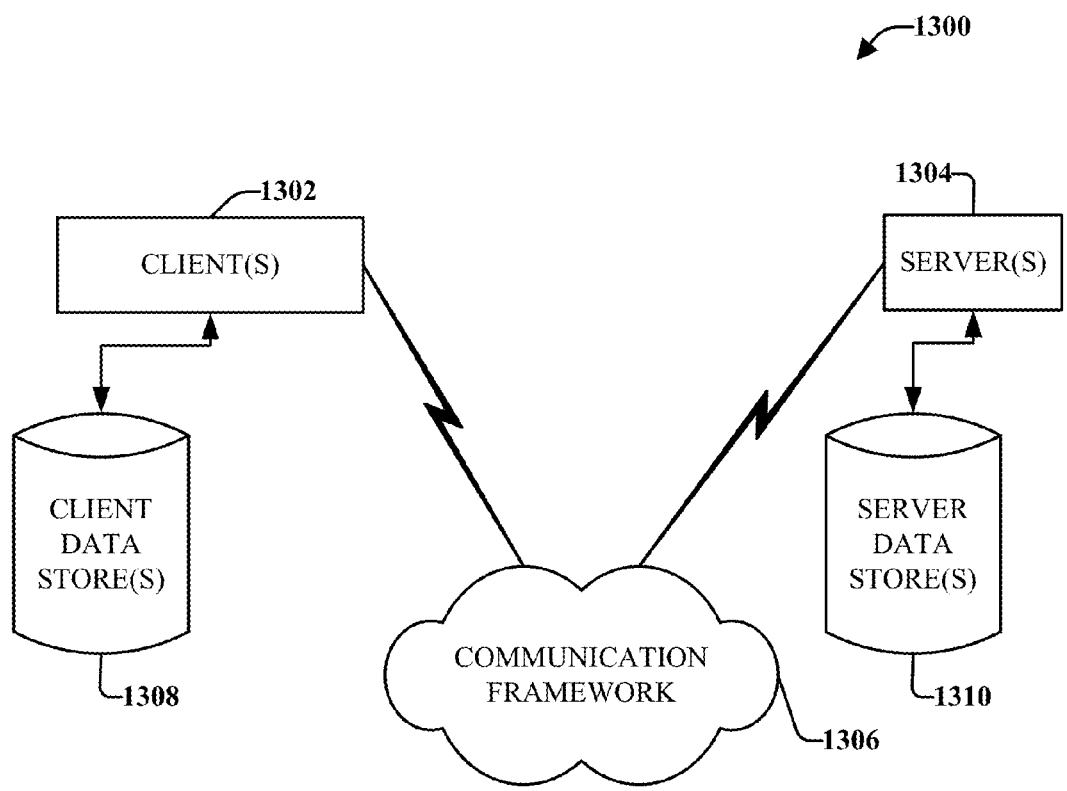
FIG. 13 is an illustration of a schematic diagram of a non-limiting computing environment for implementing one or more embodiments described in this disclosure.

Referring now to FIG. 13, there is illustrated a schematic block diagram of a computing environment 1300 for implementation of one or more aspects of the embodiments disclosed. The system 1300 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more server(s) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include a metadata, e.g., associated contextual information, for example. The system 1300 includes a communication framework 1308 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 include or are operatively connected to one or more client data store(s) 1310 that can be employed to store information local to the client(s) 1302 (e.g., associated contextual information). Similarly, the server(s) 1304 are operatively include or are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1308 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the one or more of the embodiments described herein. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that one or more embodiments includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular aspect of an embodiment may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
a memory storing computer-executable components; and
a processor configured to execute the following computer-executable components stored in the memory:
a communication component that:
facilitates a display of information indicative of an option to select one or more sound recordings for removal from a first audio file to generate a second audio file; and
facilitates a display of indicia of the second audio file; and
a processing component that generates the second audio file by removing the selected one or more sound recordings from the first audio file based on winner-take-all coding.

2. The system of claim 1, wherein the first audio file is embedded in a media file.

3. The system of claim 2, wherein the media file is a video file.

4. The system of claim 1, wherein the first audio file is a mixed audio file comprised of speech information and music information.

5. The system of claim 4, wherein the second audio file is comprised of the speech information, and wherein the selected one or more sound recordings comprise the music information.

6. The system of claim 1, wherein the system is communicatively coupled to a cloud-based video editor.

7. The system of claim 1, wherein the processing component further generates the second audio file based on Hough transform processing of information associated with a reference file matched to at least one of the one or more sound recordings and information associated with the first audio file.

8. A system, comprising:
a memory storing computer-executable components; and
a processor configured to execute the following computer-executable components stored in the memory:
an identification component that:
identifies one or more sound recordings in a first audio file; and
identifies a reference file having at least a defined level of similarity to at least one of the one or more sound recordings; and
a processing component that removes, from the first audio file, at least one of the identified one or more sound recordings to generate a second audio file, wherein the processing component comprises:
an alignment and rate component that determines a first alignment between the reference file and the first audio file by comparing a winner-take-all (WTA)-coded spectrogram of the reference file and a WTA-coded spectrogram of the first audio file.

9. The system of claim 8, further comprising a communication component that receives an input indicative of a selection of the one or more sound recordings for removal.

10. The system of claim 9, wherein the input is initiated by a user of the system.

11. The system of claim 9, wherein the communication component also facilitates displaying information regarding one or more policies associated with the one or more sound recordings.

12. The system of claim 8, wherein the system is integrated with a cloud-based video editor.

13. The system of claim 8, wherein the first audio file is embedded in a media file.

14. The system of claim 13, wherein the media file is stored on a server remote from the system.

15. The system of claim 13, further comprising:
a modification component that replaces the first audio file with the second audio file in the media file.

16. The system of claim 8, wherein the alignment and rate component further determines the first alignment by mapping, into Hough space, one or more estimated time offsets between the reference file and the first audio file.

17. The system of claim 16, wherein the alignment and rate component determines a rate adjustment between the reference file and the first audio file by mapping, into Hough space, one or more estimated rate stretch factors between the reference file and the first audio file.

18. The system of claim 16, wherein the alignment and rate component selects one of the one or more estimated time offsets and one of the one or more estimated rate stretch factors based, at least, on the mapping into the Hough space.

19. The system of claim 8, wherein the processing component further comprises:
a filtering component that filters a frequency domain representation (FR) of the reference file in a frequency domain to generate a filtered FR of the reference file.

20. The system of claim 19, wherein the FR of the reference file and an FR of the at least one of the sound recordings has a first level of similarity prior to filtering the reference file and the FR of the reference file and the FR of the at least one of the sound recordings has a second level of similarity after filtering the FR of the reference file, wherein the second level of similarity is greater than the first level of similarity.

21. The system of claim 20, wherein the processing component further comprises:
a first subtraction component that subtracts the FR of the filtered reference file from an FR of the first audio file to generate an FR of the second audio file; and
a time-frequency conversion component that converts the FR of the second audio file to the second audio file.

22. The system of claim 20, wherein the processing component further comprises:
a first subtraction component that subtracts the FR of the filtered reference file from an FR of the first audio file to generate an FR of an intermediate second audio file;
a second subtraction component that performs spectral subtraction in the frequency domain on the FR of the intermediate second audio file to generate an FR of the second audio file; and
a time-frequency conversion component that converts the FR of the second audio file to the second audio file.

23. A method, comprising:
employing a processor to execute computer-executable components stored within a memory to perform operations comprising:
identifying one or more sound recordings in a first audio file;
identifying a reference file having at least a defined level of similarity to at least one of the one or more sound recordings; and
processing the first audio file to remove the at least one of the one or more sound recordings from the first audio file and generate a second audio file, wherein the processing comprises:
determining a first alignment between the reference file and the first audio file based, at least, on comparing a winner-take-all (WTA)-coded spectrogram of the reference file and a WTA-coded spectrogram of the first audio file.

24. The method of claim 23, wherein the first audio file is embedded in a media file.

25. The method of claim 23, wherein the determining the first alignment further comprises:
mapping, into Hough space, one or more estimated time offsets between the reference file and the first audio file.

26. The method of claim 25, further comprising:
determining a rate adjustment between the reference file and the first audio file by mapping, into Hough space, one or more estimated rate stretch factors between the reference file and the first audio file.

27. The method of claim 26, further comprising:
selecting one of the one or more estimated time offsets and one of the one or more estimated rate stretch factors based, at least, on the mapping into the Hough space.

28. The method of claim 23, further comprising:
filtering the reference file in frequency domain to generate a filtered frequency domain representation (FR) of the reference file, wherein a similarity between the filtered FR of the reference file and an FR of the at least one of the one or more sound recordings is greater than a similarity between the FR of the reference file and the FR of the at least one of the one or more sound recordings.

29. The method of claim 28, wherein the processing further comprises:
subtracting the filtered FR of the reference file from the FR of the first audio file to generate an FR of the second audio file; and converting the FR of the second audio file to the second audio file.

30. The method of claim 28, wherein the processing further comprises:
subtracting the filtered FR of the reference file from the FR of the first audio file to generate an FR of an intermediate second audio file;
performing spectral subtraction in the frequency domain on the FR of the intermediate second audio file to generate an FR of the second audio file; and
converting the FR of the second audio file to the second audio file.

* * * * *